US008478665B1

(12) United States Patent
Smith et al.

(10) Patent No.: US 8,478,665 B1
(45) Date of Patent: Jul. 2, 2013

(54) VEHICLE ORDERING SYSTEM

(75) Inventors: David M. Smith, Los Altos, CA (US);
Erin E. Benderly, Avon, CO (US);
David M. Smith, Jr., Oakland, CA (US);
Sean Benderly, Avon, CO (US)

(73) Assignee: AutoSalesVelocity, Inc., Los Altos, CA (US)

( * ) Notice: Subject to any disclaimer, the term of this patent is extended or adjusted under 35 U.S.C. 154(b) by 179 days.

(21) Appl. No.: 13/011,709

(22) Filed: Jan. 21, 2011

(51) Int. Cl.
*G06Q 10/00* (2012.01)
(52) U.S. Cl.
USPC .......................................................... 705/28
(58) Field of Classification Search
USPC .......................................................... 705/28
See application file for complete search history.

(56) References Cited

U.S. PATENT DOCUMENTS

| | | | | |
|---|---|---|---|---|
| 5,765,143 | A * | 6/1998 | Sheldon et al. | 705/28 |
| 6,470,324 | B1 * | 10/2002 | Brown et al. | 705/28 |
| 7,865,409 | B1 * | 1/2011 | Monaghan | 705/28 |
| 8,214,313 | B1 * | 7/2012 | Puskorius et al. | 706/28 |
| 8,428,985 | B1 * | 4/2013 | Puskorius et al. | 705/7.11 |
| 2002/0194051 | A1 * | 12/2002 | Hall et al. | 705/10 |
| 2003/0130966 | A1 * | 7/2003 | Thompson et al. | 705/500 |

OTHER PUBLICATIONS

"AutoSalesVelocity, Inc.—Data Driven New Vehicle Ordering & Inventory Management" web site, archived on May 26, 2009 at [URL: http://web.archive.org/web/20090526065224/http://autosalesvelocity.com/].*
"AutoSalesVelocity, Inc.—New Vehicle Ordering System" web site, archived on Apr. 24, 2009 at [URL: http://web.archive.org/web/20090424060054/http://autosalesvelcoity.com/nvo/service.cfm].*
"AutoSalesVelocity, Inc.—Lot Manager" web site, archived on Apr. 24, 2009 at [URL: http://web.archive.org/web/20090424043035/http://autosalesvelocity.com/lotmanager.cfm], printed in portrait format.*
"AutoSalesVelocity, Inc.—Lot Manager" web site, archived on Apr. 24, 2009 at [URL: http://web.archive.org/web/20090424043035/http://autosalesvelocity.com/lotmanager.cfm], printed in landscape format.*

* cited by examiner

*Primary Examiner* — Susanna M Meinecke Diaz
(74) *Attorney, Agent, or Firm* — Gard & Kaslow LLP

(57) ABSTRACT

A vehicle ordering system that recommends to a vehicle dealership a vehicle to order from a vehicle manufacturer based on past sales (at various sales time periods and taking into account sales at the dealership level versus sales at the district and/or region level), current inventory (including in stock and in route), anticipated but not yet finalized orders, dealership size and calculated metrics derived from and using those elements.

18 Claims, 39 Drawing Sheets

FIG. 3

1. Time Factor for Past Sales (Weights for Time Periods & Model Year Changeover) ← 301

DEALERSHIP LEVEL

|  |  | Current Model Year | | | Past Model Year | | |
|---|---|---|---|---|---|---|---|
|  |  | 30 Days | 90 Days | Full MY | 30 Days | 90 Days | Full MY |
| Sales | Units | 1 | 3 | 3 | 31 | 92 | 612 |
| Extra Weight | on Current MY | 2 | 6 | 6 |  |  |  |
| Weighted % | Within Each Time Period | 6.1% | 6.1% | 1.0% | 93.9% | 93.9% | 99.0% |
| Time Period WT | For Each Time Period | 20% | 70% | 10% | 20% | 70% | 10% |
| Time Factor |  | 1.2% | 4.3% | 0.1% | 18.8% | 65.7% | 9.9% |

← 304, 305, 306, 307, 308 (100% on Current MY)

DISTRICT LEVEL ← 302

|  |  | Current Model Year | | | Past Model Year | | |
|---|---|---|---|---|---|---|---|
|  |  | 30 Days | 90 Days | Full MY | 30 Days | 90 Days | Full MY |
| Sales | Units | 16 | 25 | 25 | 120 | 457 | 2885 |
| Extra Weight | on Current MY | 32 | 50 | 50 |  |  |  |
| Weighted % | Within Each Time Period | 21.1% | 9.9% | 1.7% | 78.9% | 90.1% | 98.3% |
| Time Period WT | For Each Time Period | 20% | 70% | 10% | 20% | 70% | 10% |
| Time Factor |  | 4.2% | 6.9% | 0.2% | 15.8% | 63.1% | 9.8% |

REGION LEVEL ← 303

|  |  | Current Model Year | | | Past Model Year | | |
|---|---|---|---|---|---|---|---|
|  |  | 30 Days | 90 Days | Full MY | 30 Days | 90 Days | Full MY |
| Sales | Units | 141 | 248 | 248 | 418 | 1815 | 11445 |
| Extra Weight | on Current MY | 282 | 496 | 496 |  |  |  |
| Weighted % | Within Each Time Period | 40.3% | 21.5% | 4.2% | 59.7% | 78.5% | 95.8% |
| Time Period WT | For Each Time Period | 20% | 70% | 10% | 20% | 70% | 10% |
| Time Factor |  | 8.1% | 15.0% | 0.4% | 11.9% | 55.0% | 9.6% |

2. Dealer Sizing for Factor Groups (Dealer 90 Day Sales + Dealer Total Inventory)

| => | < | Category |
|---|---|---|
| 0 | 10 | Tiny |
| 10 | 30 | Small |
| 30 | 50 | Small/Med |
| 50 | 90 | Medium |
| 90 | 150 | Large |
| 150 | 300 | Extra Large |
| 300 | 400 | XXL |
| 400 | 1000000 | XXXL |

Dealer 90 Day Sales (Current & Past Model Year)   95
Dealer Total Inventory   213
Total   308

3. Metric Factors/Deliver Factors/Sizing Factors by Dealer Size

| | 4. Delivery Factor | | 5. Sales/Stock GAP | | | | 6. Dlr Inv % vs Area Sales | | | |
|---|---|---|---|---|---|---|---|---|---|---|
| | Order Bank | Pipeline | Metric Factor | Dealer Sizing | District Sizing | Region Sizing | Metric Factor | Dealer Sizing | District Sizing | Region Sizing |
| Tiny | 0.4 | 0.15 | 100 | 0.25 | 0.5 | 0.5 | 100 | 0 | 0.75 | 0.75 |
| Small | 0.66 | 0.15 | 100 | 0.375 | 0.5 | 0.5 | 100 | 0 | 0.66 | 0.66 |
| Small/Med | 0.8 | 0.15 | 100 | 0.75 | 0.66 | 0.66 | 100 | 0 | 0.66 | 0.66 |
| Medium | 1.25 | 0.15 | 100 | 1.33 | 0.66 | 0.66 | 100 | 0 | 0.5 | 0.5 |
| Large | 2 | 0.15 | 100 | 2 | 1 | 1 | 100 | 0 | 0.5 | 0.5 |
| Extra Large | 2.25 | 0.15 | 100 | 2 | 1 | 1 | 100 | 0 | 0.5 | 0.5 |
| XXL | 3 | 0.15 | 100 | 2 | 1 | 1 | 100 | 0 | 0.5 | 0.5 |
| XXXL | 5 | 0.15 | 100 | 2 | 1 | 1 | 100 | 0 | 0.5 | 0.5 |

| | 7. Total Sales | | | | 8. Days To Turn | | | | 9. Days On Lot | | | |
|---|---|---|---|---|---|---|---|---|---|---|---|---|
| | Metric Factor | Dealer Sizing | District Sizing | Region Sizing | Metric Factor | Dealer Sizing | District Sizing | Region Sizing | Metric Factor | Dealer Sizing | District Sizing | Region Sizing |
| Tiny | 10 | 1 | 2 | 2 | 1 | 0.33 | 1 | 1 | 1 | 0.33 | 1 | 1 |
| Small | 10 | 1.25 | 2 | 2 | 1 | 0.5 | 1 | 1 | 1 | 0.33 | 1 | 1 |
| Small/Med | 10 | 1 | 1.5 | 1.5 | 1 | 0.75 | 1 | 1 | 1 | 0.33 | 0.75 | 0.75 |
| Medium | 10 | 1 | 1 | 1 | 1 | 1.25 | 1.1 | 1 | 1 | 0.33 | 0.66 | 0.66 |
| Large | 10 | 1 | 1 | 1 | 1 | 0.5 | 0.25 | 0.25 | 1 | 0.33 | 0.25 | 0.25 |
| Extra Large | 10 | 1 | 1 | 1 | 1 | 0.5 | 0.25 | 0.25 | 1 | 0.33 | 0.25 | 0.25 |
| XXL | 10 | 1 | 1 | 1 | 1 | 0.5 | 0.25 | 0.25 | 1 | 0.33 | 0.25 | 0.25 |
| XXXL | 10 | 1 | 1 | 1 | 1 | 0.5 | 0.25 | 0.25 | 1 | 0.33 | 0.25 | 0.25 |

4. Re-Factor Dealer Inventory Percentage to Add Weight for Oder Bank and Pipeline

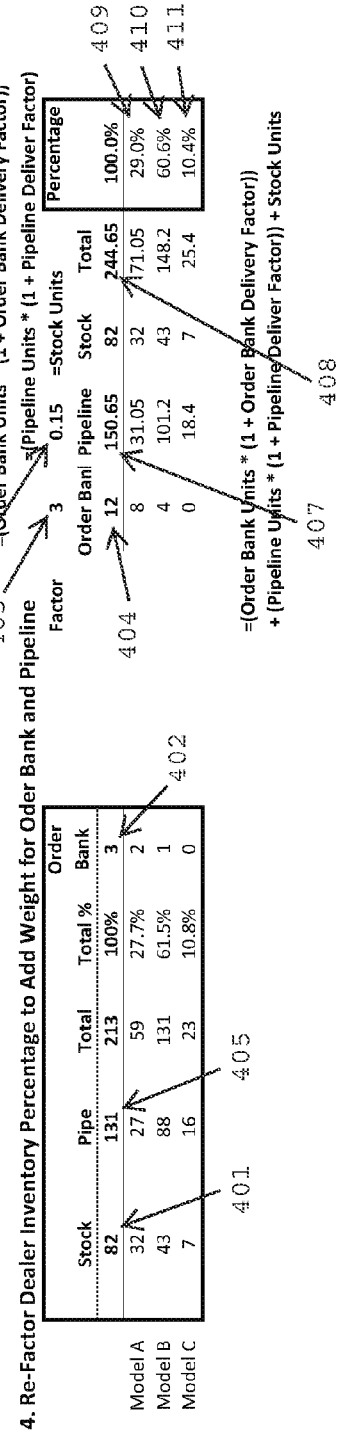

| | Stock | Pipe | Total | Total % | Order Bank | Factor | Order Bank | Pipeline | Stock | Total | Percentage |
|---|---|---|---|---|---|---|---|---|---|---|---|
| | 82 | 131 | 213 | 100% | 3 | 3 | 12 | 150.65 | 82 | 244.65 | 100.0% |
| Model A | 32 | 27 | 59 | 27.7% | 2 | | 8 | 31.05 | 32 | 171.05 | 29.0% |
| Model B | 43 | 88 | 131 | 61.5% | 1 | | 4 | 101.2 | 43 | 148.2 | 60.6% |
| Model C | 7 | 16 | 23 | 10.8% | 0 | | 0 | 18.4 | 7 | 25.4 | 10.4% |

401  405  402  403  404  406  407  408  409  410  411

=(Order Bank Units * (1 + Order Bank Delivery Factor)
=(Pipeline Units * (1 + Pipeline Deliver Factor)
=Stock Units =(Order Bank Units * (1 + Order Bank Delivery Factor)
+ (Pipeline Units * (1 + Pipeline Deliver Factor) + Stock Units FIG. 5A
5. Sales/Stock Gap
Metric Factor  100                     Sales/Stock Gap=(Sales%−Factored Inventory%)*Metric Factor*Dealer/District/Region Sizing Factor*Time Factor

Current Model Year/30 Days Sales

| | Dealer | Sizing Factor 2 | Factored Inv Total % (see 4) | Gap | Time Factor Total | Time Weighted Total 1.2% | District | Sizing Factor 1 | Inv Total % | Gap | Time Factor Total | Time Weighted Total 4.2% | Region | Sizing Factor 1 | Inv Total % | Gap | Time Factor Total | Time Weighted Total 8.1% | Sub Total |
|---|---|---|---|---|---|---|---|---|---|---|---|---|---|---|---|---|---|---|---|
| Model A | 100.0% | | 29.0% | 71.0% | 141.9 | 1.7 | 31.3% | | 29.9% | 1.3% | 1.3 | 0.1 | 26.2% | | 28.1% | -1.8% | -1.8 | -0.1 | 1.6 |
| Model B | 0.0% | | 60.6% | -60.6% | -121.2 | -1.5 | 43.8% | | 58.6% | -14.8% | -14.8 | -0.6 | 66.0% | | 62.3% | 3.7% | 3.7 | 0.3 | -1.8 |
| Model C | 0.0% | | 10.4% | -10.4% | -20.8 | -0.3 | 25.0% | | 11.5% | 13.5% | 13.5 | 0.6 | 7.8% | | 9.7% | -1.9% | -1.9 | -0.1 | 0.2 |

Current Model Year/90 Days Sales

| | Dealer | Sizing Factor 2 | Factored Inv Total % (see 4) | Gap | Time Factor Total | Time Weighted Total 4.3% | District | Sizing Factor 1 | Inv Total % | Gap | Time Factor Total | Time Weighted Total 6.9% | Region | Sizing Factor 1 | Inv Total % | Gap | Time Factor Total | Time Weighted Total 15.0% | Sub Total |
|---|---|---|---|---|---|---|---|---|---|---|---|---|---|---|---|---|---|---|---|
| Model A | 33.3% | | 29.0% | 4.3% | 8.6 | 0.4 | 40.0% | | 29.9% | 10.1% | 10.1 | 0.7 | 27.4% | | 28.1% | -0.6% | -0.6 | -0.1 | 1.0 |
| Model B | 33.3% | | 60.6% | -27.2% | -54.5 | -2.3 | 40.0% | | 58.6% | -18.6% | -18.6 | -1.3 | 62.9% | | 62.3% | 0.6% | 0.6 | 0.1 | -3.5 |
| Model C | 33.3% | | 10.4% | 23.0% | 45.9 | 2.0 | 20.0% | | 11.5% | 8.5% | 8.5 | 0.6 | 9.7% | | 9.7% | 0.0% | 0.0 | 0.0 | 2.6 |

Current Model Year/Full Model Year Sales

| | Dealer | Sizing Factor 2 | Factored Inv Total % (see 4) | Gap | Time Factor Total | Time Weighted Total 0.1% | District | Sizing Factor 1 | Inv Total % | Gap | Time Factor Total | Time Weighted Total 0.2% | Region | Sizing Factor 1 | Inv Total % | Gap | Time Factor Total | Time Weighted Total 0.4% | Sub Total |
|---|---|---|---|---|---|---|---|---|---|---|---|---|---|---|---|---|---|---|---|
| Model A | 33.3% | | 29.0% | 4.3% | 8.6 | 0.0 | 40.0% | | 29.9% | 10.1% | 10.1 | 0.0 | 27.4% | | 28.1% | -0.6% | -0.6 | 0.0 | 0.0 |
| Model B | 33.3% | | 60.6% | -27.2% | -54.5 | -0.1 | 40.0% | | 58.6% | -18.6% | -18.6 | 0.0 | 62.9% | | 62.3% | 0.6% | 0.6 | 0.0 | -0.1 |
| Model C | 33.3% | | 10.4% | 23.0% | 45.9 | 0.0 | 20.0% | | 11.5% | 8.5% | 8.5 | 0.0 | 9.7% | | 9.7% | 0.0% | 0.0 | 0.0 | 0.1 |

FIG. 5B

Past Model Year/30 Days Sales

| | Dealer | | | | | | District | | | | | | Region | | | | | | Sub Total |
|---|---|---|---|---|---|---|---|---|---|---|---|---|---|---|---|---|---|---|---|
| | Sales % | Sizing Factor | Factored Inv Total % (see 4) | Gap 2 | Time Factor Total | Time Weighted Total 18.8% | Sales % | Sizing Factor | Inv Total % | Gap 1 | Time Factor Total | Time Weighted Total 15.8% | Sales % | Sizing Factor | Inv Total % | Gap 1 | Time Factor Total | Time Weighted Total 11.9% | |
| Model A | 54.8% | 29.0% | 29.0% | 25.8% | 51.6 | 9.7 | 27.5% | 29.9% | 29.9% | -2.4% | -2.4 | -0.4 | 25.1% | 28.1% | 28.1% | -2.9% | -2.9 | -0.4 | 9.0 |
| Model B | 45.2% | 60.6% | 60.6% | -15.4% | -30.8 | -5.8 | 67.5% | 58.6% | 58.6% | 8.9% | 8.9 | 1.4 | 67.5% | 62.3% | 62.3% | 5.2% | 5.2 | 0.6 | -3.8 |
| Model C | 0.0% | 10.4% | 10.4% | -10.4% | -20.8 | -3.9 | 5.0% | 11.5% | 11.5% | -6.5% | -6.5 | -1.0 | 7.4% | 9.7% | 9.7% | -2.2% | -2.2 | -0.3 | -5.2 |

Past Model Year/90 Days Sales

| | Dealer | | | | | | District | | | | | | Region | | | | | | Sub Total |
|---|---|---|---|---|---|---|---|---|---|---|---|---|---|---|---|---|---|---|---|
| | Sales % | Sizing Factor | Factored Inv Total % (see 4) | Gap 2 | Time Factor Total | Time Weighted Total 65.7% | Sales % | Sizing Factor | Inv Total % | Gap 1 | Time Factor Total | Time Weighted Total 63.1% | Sales % | Sizing Factor | Inv Total % | Gap 1 | Time Factor Total | Time Weighted Total 55.0% | |
| Model A | 39.1% | 29.0% | 29.0% | 10.1% | 20.2 | 13.3 | 25.2% | 29.9% | 29.9% | -4.8% | -4.8 | -3.0 | 25.8% | 28.1% | 28.1% | -2.3% | -2.3 | -1.2 | 9.0 |
| Model B | 57.6% | 60.6% | 60.6% | -3.0% | -5.9 | -3.9 | 64.8% | 58.6% | 58.6% | 6.2% | 6.2 | 3.9 | 64.9% | 62.3% | 62.3% | 2.6% | 2.6 | 1.4 | 1.5 |
| Model C | 3.3% | 10.4% | 10.4% | -7.1% | -14.2 | -9.4 | 10.1% | 11.5% | 11.5% | -1.4% | -1.4 | -0.9 | 9.3% | 9.7% | 9.7% | -0.3% | -0.3 | -0.2 | -10.5 |

Past Model Year/Full Model Year Sales

| | Dealer | | | | | | District | | | | | | Region | | | | | | Sub Total |
|---|---|---|---|---|---|---|---|---|---|---|---|---|---|---|---|---|---|---|---|
| | Sales % | Sizing Factor | Factored Inv Total % (see 4) | Gap 2 | Time Factor Total | Time Weighted Total 9.9% | Sales % | Sizing Factor | Inv Total % | Gap 1 | Time Factor Total | Time Weighted Total 9.8% | Sales % | Sizing Factor | Inv Total % | Gap 1 | Time Factor Total | Time Weighted Total 9.6% | |
| Model A | 24.7% | 29.0% | 29.0% | -4.4% | -8.7 | -0.9 | 24.4% | 29.9% | 29.9% | -5.5% | -5.5 | -0.5 | 22.3% | 28.1% | 28.1% | -5.8% | -5.8 | -0.6 | -2.0 |
| Model B | 63.4% | 60.6% | 60.6% | 2.8% | 5.6 | 0.6 | 64.3% | 58.6% | 58.6% | 5.8% | 5.8 | 0.6 | 66.2% | 62.3% | 62.3% | 3.9% | 3.9 | 0.4 | 1.5 |
| Model C | 11.9% | 10.4% | 10.4% | 1.5% | 3.1 | 0.3 | 11.3% | 11.5% | 11.5% | -0.2% | -0.2 | 0.0 | 11.6% | 9.7% | 9.7% | 1.9% | 1.9 | 0.2 | 0.5 |

Model A  18.6
Model B  -6.2
Model C  -12.4

6. Dealer Inv % vs. Area Sales %

Metric Factor   100   Dealer Inv % vs. Area Sales %=(Sales%-Factored Dealer Inventory%)*Metric Factor*District/Region Sizing Factor*Time Factor

Current Model Year/30 Days Sales

| | Dealer | | | | | | District | | | | | | | Region | | | | | | |
|---|---|---|---|---|---|---|---|---|---|---|---|---|---|---|---|---|---|---|---|---|
| | Sales % | Sizing Factor | Dealer Factored Inv Total % | Gap | Time Factor 0 | Total | Time Weighted Total 1.2% | Sales % | Sizing Factor | Dealer Factored d Inv | Gap | Time Factor 0.5 | Total | Time Weighted Total 4.2% | Sales % | Sizing Factor | Dealer Factored d Inv | Gap | Time Factor 0.5 | Total | Time Weighted Total 8.1% | Sub Total |
| Model A | | | | | | | | 31.3% | 29.0% | 2.2% | 1.1 | 0.0 | | 26.2% | 29.0% | -2.8% | -1.4 | -0.1 | -0.1 |
| Model B | | | | | | | | 43.8% | 60.6% | -16.8% | -8.4 | -0.4 | | 66.0% | 60.6% | 5.4% | 2.7 | 0.2 | -0.1 |
| Model C | | | | | | | | 25.0% | 10.4% | 14.6% | 7.3 | 0.3 | | 7.8% | 10.4% | -2.6% | -1.3 | -0.1 | 0.2 |

Current Model Year/90 Days Sales

| | Dealer | | | | | | | District | | | | | | | Region | | | | | | |
|---|---|---|---|---|---|---|---|---|---|---|---|---|---|---|---|---|---|---|---|---|
| | Sales % | Sizing Factor | Dealer Factored Inv Total % | Gap | Time Factor 0 | Total | Time Weighted Total 4.3% | Sales % | Sizing Factor | Dealer Factored d Inv | Gap | Time Factor 0.5 | Total | Time Weighted Total 6.9% | Sales % | Sizing Factor | Dealer Factored d Inv | Gap | Time Factor 0.5 | Total | Time Weighted Total 15.0% | Sub Total |
| Model A | | | | | | | | 40.0% | 29.0% | 11.0% | 5.5 | 0.4 | | 27.4% | 29.0% | -1.6% | -0.8 | -0.1 | 0.3 |
| Model B | | | | | | | | 40.0% | 60.6% | -20.6% | -10.3 | -0.7 | | 62.9% | 60.6% | 2.3% | 1.2 | 0.2 | -0.5 |
| Model C | | | | | | | | 20.0% | 10.4% | 9.6% | 4.8 | 0.3 | | 9.7% | 10.4% | -0.7% | -0.4 | -0.1 | 0.3 |

Current Model Year/Full Model Year Sales

| | Dealer | | | | | | | District | | | | | | | Region | | | | | | |
|---|---|---|---|---|---|---|---|---|---|---|---|---|---|---|---|---|---|---|---|---|
| | Sales % | Sizing Factor | Dealer Factored Inv Total % | Gap | Time Factor 0 | Total | Time Weighted Total 0.1% | Sales % | Sizing Factor | Dealer Factored d Inv | Gap | Time Factor 0.5 | Total | Time Weighted Total 0.2% | Sales % | Sizing Factor | Dealer Factored d Inv | Gap | Time Factor 0.5 | Total | Time Weighted Total 0.4% | Sub Total |
| Model A | | | | | | | | 40.0% | 29.0% | 11.0% | 5.5 | 0.0 | | 27.4% | 29.0% | -1.6% | -0.8 | 0.0 | 0.0 |
| Model B | | | | | | | | 40.0% | 60.6% | -20.6% | -10.3 | 0.0 | | 62.9% | 60.6% | 2.3% | 1.2 | 0.0 | 0.0 |
| Model C | | | | | | | | 20.0% | 10.4% | 9.6% | 4.8 | 0.0 | | 9.7% | 10.4% | -0.7% | -0.4 | 0.0 | 0.0 |

FIG. 6B

Past Model Year/30 Days Sales

| | Dealer | | | | District | | | | | | Region | | | | | | |
|---|---|---|---|---|---|---|---|---|---|---|---|---|---|---|---|---|---|
| | Sales % | Sizing Factor Dealer Factored Inv Total % | Gap 0 | Time Factor | Time Weighted Total 18.8% | | Sales % | Sizing Factor Dealer Factored d Inv | Gap 0.5 | Time Factor | Time Weighted Total 15.8% | | Sales % | Sizing Factor Dealer Factored d Inv | Gap 0.5 | Time Factor | Time Weighted Total 11.9% | Sub Total |
| Model A | | | | | | | 27.5% | 29.0% | -1.5% | -0.8 | -0.1 | | 25.1% | 29.0% | -3.9% | -2.0 | -0.2 | -0.4 |
| Model B | | | | | | | 67.5% | 60.6% | 6.9% | 3.5 | 0.5 | | 67.5% | 60.6% | 6.9% | 3.4 | 0.4 | 1.0 |
| Model C | | | | | | | 5.0% | 10.4% | -5.4% | -2.7 | -0.4 | | 7.4% | 10.4% | -3.0% | -1.5 | -0.2 | -0.6 |

Past Model Year/90 Days Sales

| | Dealer | | | | District | | | | | | Region | | | | | | |
|---|---|---|---|---|---|---|---|---|---|---|---|---|---|---|---|---|---|
| | Sales % | Sizing Factor Dealer Factored Inv Total % | Gap 0 | Time Factor | Time Weighted Total 65.7% | | Sales % | Sizing Factor Dealer Factored d Inv | Gap 0.5 | Time Factor | Time Weighted Total 63.1% | | Sales % | Sizing Factor Dealer Factored d Inv | Gap 0.5 | Time Factor | Time Weighted Total 55.0% | Sub Total |
| Model A | | | | | | | 25.2% | 29.0% | -3.9% | -1.9 | -1.2 | | 25.8% | 29.0% | -3.3% | -1.6 | -0.9 | -2.1 |
| Model B | | | | | | | 64.8% | 60.6% | 4.2% | 2.1 | 1.3 | | 64.9% | 60.6% | 4.3% | 2.2 | 1.2 | 2.5 |
| Model C | | | | | | | 10.1% | 10.4% | -0.3% | -0.2 | -0.1 | | 9.3% | 10.4% | -1.1% | -0.5 | -0.3 | -0.4 |

Past Model Year/Full Model Year Sales

| | Dealer | | | | District | | | | | | Region | | | | | | |
|---|---|---|---|---|---|---|---|---|---|---|---|---|---|---|---|---|---|
| | Sales % | Sizing Factor Dealer Factored Inv Total % | Gap 0 | Time Factor | Time Weighted Total 9.9% | | Sales % | Sizing Factor Dealer Factored d Inv | Gap 0.5 | Time Factor | Time Weighted Total 9.8% | | Sales % | Sizing Factor Dealer Factored d Inv | Gap 0.5 | Time Factor | Time Weighted Total 9.6% | Sub Total |
| Model A | | | | | | | 24.4% | 29.0% | -4.6% | -2.3 | -0.2 | | 22.3% | 29.0% | -6.8% | -3.4 | -0.3 | -0.6 |
| Model B | | | | | | | 64.3% | 60.6% | 3.8% | 1.9 | 0.2 | | 66.2% | 60.6% | 5.6% | 2.8 | 0.3 | 0.5 |
| Model C | | | | | | | 11.3% | 10.4% | 0.9% | 0.4 | 0.0 | | 11.6% | 10.4% | 1.2% | 0.6 | 0.1 | 0.1 |

Model A  -2.8
Model B  3.2
Model C  -0.4

605

FIG. 7A
7. Sales Total % (optional)
Metric Factor   10                    Sales Total %=Sales%*Metric Factor*Dealer/District/Region Sizing Factor* Time Factor
                        701
              702

Current Model Year/30 Days Sales

| Dealer | Sizing Factor | Sales% | Time Factor | Total | Time Weighted Total | District | Sizing Factor | | Sales% | Time Factor | Total | Time Weighted Total | Region | Sizing Factor | | Sales% | Time Factor | Total | Time Weighted Total | Sub Total |
|---|---|---|---|---|---|---|---|---|---|---|---|---|---|---|---|---|---|---|---|---|
| | | 1 | | | 1.2% | | | 1 | | | 4.2% | | | 1 | | | 8.1% | |
| Model A | | 100.0% | 10.0 | 0.1 | | | | | 31.3% | 3.1 | 0.1 | | | | | 26.2% | 2.6 | 0.2 | 0.5 |
| Model B | | 0.0% | 0.0 | 0.0 | | | | | 43.8% | 4.4 | 0.2 | | | | | 66.0% | 6.6 | 0.5 | 0.7 |
| Model C | | 0.0% | 0.0 | 0.0 | | | | | 25.0% | 2.5 | 0.1 | | | | | 7.8% | 0.8 | 0.1 | 0.2 |

Current Model Year/90 Days Sales

| Dealer | Sizing Factor | Sales% | Time Factor | Total | Time Weighted Total | District | Sizing Factor | | Sales% | Time Factor | Total | Time Weighted Total | Region | Sizing Factor | | Sales% | Time Factor | Total | Time Weighted Total | Sub Total |
|---|---|---|---|---|---|---|---|---|---|---|---|---|---|---|---|---|---|---|---|---|
| | | 1 | | | 4.3% | | | 1 | | | 6.9% | | | 1 | | | 15.0% | |
| Model A | | 33.3% | 3.3 | 0.1 | | | | | 40.0% | 4.0 | 0.3 | | | | | 27.4% | 2.7 | 0.4 | 0.8 |
| Model B | | 33.3% | 3.3 | 0.1 | | | | | 40.0% | 4.0 | 0.3 | | | | | 62.9% | 6.3 | 0.9 | 1.4 |
| Model C | | 33.3% | 3.3 | 0.1 | | | | | 20.0% | 2.0 | 0.1 | | | | | 9.7% | 1.0 | 0.1 | 0.4 |

Current Model Year/Full Model Year Sales

| Dealer | Sizing Factor | Sales% | Time Factor | Total | Time Weighted Total | District | Sizing Factor | | Sales% | Time Factor | Total | Time Weighted Total | Region | Sizing Factor | | Sales% | Time Factor | Total | Time Weighted Total | Sub Total |
|---|---|---|---|---|---|---|---|---|---|---|---|---|---|---|---|---|---|---|---|---|
| | | 1 | | | 0.1% | | | 1 | | | 0.2% | | | 1 | | | 0.4% | |
| Model A | | 33.3% | 3.3 | 0.0 | | | | | 40.0% | 4.0 | 0.0 | | | | | 27.4% | 2.7 | 0.0 | 0.0 |
| Model B | | 33.3% | 3.3 | 0.0 | | | | | 40.0% | 4.0 | 0.0 | | | | | 62.9% | 6.3 | 0.0 | 0.0 |
| Model C | | 33.3% | 3.3 | 0.0 | | | | | 20.0% | 2.0 | 0.0 | | | | | 9.7% | 1.0 | 0.0 | 0.0 |

FIG. 7B

Past Model Year/30 Days Sales

| | Dealer | | | | | District | | | | | Region | | | | | |
|---|---|---|---|---|---|---|---|---|---|---|---|---|---|---|---|---|
| | | Sizing Factor | 1 | Time Factor | 18.8% | | Sizing Factor | 1 | Time Factor | 15.8% | | Sizing Factor | 1 | Time Factor | 11.9% | |
| | | | Sales% | Total | Time Weighted Total | | | Sales% | Total | Time Weighted Total | | | Sales% | Total | Time Weighted Total | Sub Total |
| Model A | | | 54.8% | 5.5 | 1.0 | | | 27.5% | 2.8 | 0.4 | | | 25.1% | 2.5 | 0.3 | 1.8 |
| Model B | | | 45.2% | 4.5 | 0.8 | | | 67.5% | 6.8 | 1.1 | | | 67.5% | 6.7 | 0.8 | 2.7 |
| Model C | | | 0.0% | 0.0 | 0.0 | | | 5.0% | 0.5 | 0.1 | | | 7.4% | 0.7 | 0.1 | 0.2 |

Past Model Year/90 Days Sales

| | Dealer | | | | | District | | | | | Region | | | | | |
|---|---|---|---|---|---|---|---|---|---|---|---|---|---|---|---|---|
| | | Sizing Factor | 1 | Time Factor | 65.7% | | Sizing Factor | 1 | Time Factor | 63.1% | | Sizing Factor | 1 | Time Factor | 55.0% | |
| | | | Sales% | Total | Time Weighted Total | | | Sales% | Total | Time Weighted Total | | | Sales% | Total | Time Weighted Total | Sub Total |
| Model A | | | 39.1% | 3.9 | 2.6 | | | 25.2% | 2.5 | 1.6 | | | 25.8% | 2.6 | 1.4 | 5.6 |
| Model B | | | 57.6% | 5.8 | 3.8 | | | 64.8% | 6.5 | 4.1 | | | 64.9% | 6.5 | 3.6 | 11.4 |
| Model C | | | 3.3% | 0.3 | 0.2 | | | 10.1% | 1.0 | 0.6 | | | 9.3% | 0.9 | 0.5 | 1.4 |

Past Model Year/Full Model Year Sales

| | Dealer | | | | | District | | | | | Region | | | | | |
|---|---|---|---|---|---|---|---|---|---|---|---|---|---|---|---|---|
| | | Sizing Factor | 1 | Time Factor | 9.9% | | Sizing Factor | 1 | Time Factor | 9.8% | | Sizing Factor | 1 | Time Factor | 9.6% | |
| | | | Sales% | Total | Time Weighted Total | | | Sales% | Total | Time Weighted Total | | | Sales% | Total | Time Weighted Total | Sub Total |
| Model A | | | 24.7% | 2.5 | 0.2 | | | 24.4% | 2.4 | 0.2 | | | 22.3% | 2.2 | 0.2 | 0.7 |
| Model B | | | 63.4% | 6.3 | 0.6 | | | 64.3% | 6.4 | 0.6 | | | 66.2% | 6.6 | 0.6 | 1.9 |
| Model C | | | 11.9% | 1.2 | 0.1 | | | 11.3% | 1.1 | 0.1 | | | 11.6% | 1.2 | 0.1 | 0.3 |

Model A  9.4
Model B  18.2
Model C  2.5

703

FIG. 8A
8. Days To Turn
Metric Factor  1  803  802  801              Days To Turn=Diff DTT*Sales%*Metric Factor*Dealer/District/Region Sizing Factor*Time Factor

Current Model Year/30 Days Sales

| Dealer | Factor | 0.5 | Factor | 1.2% | District | Factor | 0.25 | Factor | 4.2% | Region | Factor | 0.25 | Factor | 8.1% |
|---|---|---|---|---|---|---|---|---|---|---|---|---|---|---|
| | Diff DTT | Sales% | Total | Time Weighted | | Diff DTT | Sales% | Total | Time Weighted | | Diff DTT | Sales% | Total | Time Weighted | Sub Total |
| Model A | 0.0 | 100.0% | 0.0 | 0.0 | | -8.0 | 31.3% | -0.6 | 0.0 | | -2.1 | 26.2% | -0.1 | 0.0 | 0.0 |
| Model B | 55.0 | 0.0% | 0.0 | 0.0 | | 8.0 | 43.8% | 0.9 | 0.0 | | 0.9 | 66.0% | 0.2 | 0.0 | 0.0 |
| Model C | 55.0 | 0.0% | 0.0 | 0.0 | | -4.0 | 25.0% | -0.3 | 0.0 | | -1.1 | 7.8% | 0.0 | 0.0 | 0.0 |

Current Model Year/90 Days Sales

| Dealer | Factor | 0.5 | Factor | 4.3% | District | Factor | 0.25 | Factor | 6.9% | Region | Factor | 0.25 | Factor | 15.0% |
|---|---|---|---|---|---|---|---|---|---|---|---|---|---|---|
| | Diff DTT | Sales% | Total | Time Weighted | | Diff DTT | Sales% | Total | Time Weighted | | Diff DTT | Sales% | Total | Time Weighted | Sub Total |
| Model A | -12.7 | 33.3% | -2.1 | -0.1 | | 1.2 | 40.0% | 0.1 | 0.0 | | -0.6 | 27.4% | 0.0 | 0.0 | -0.1 |
| Model B | -1.7 | 33.3% | -0.3 | 0.0 | | 3.2 | 40.0% | 0.3 | 0.0 | | 0.4 | 62.9% | 0.1 | 0.0 | 0.0 |
| Model C | 14.3 | 33.3% | 2.4 | 0.1 | | -8.8 | 20.0% | -0.4 | 0.0 | | -0.6 | 9.7% | 0.0 | 0.0 | 0.1 |

Current Model Year/Full Model Year Sales

| Dealer | Factor | 0.5 | Factor | 0.1% | District | Factor | 0.25 | Factor | 0.2% | Region | Factor | 0.25 | Factor | 0.4% |
|---|---|---|---|---|---|---|---|---|---|---|---|---|---|---|
| | Diff DTT | Sales% | Total | Time Weighted | | Diff DTT | Sales% | Total | Time Weighted | | Diff DTT | Sales% | Total | Time Weighted | Sub Total |
| Model A | -12.7 | 33.3% | -2.1 | 0.0 | | 1.2 | 40.0% | 0.1 | 0.0 | | -0.6 | 27.4% | 0.0 | 0.0 | 0.0 |
| Model B | -1.7 | 33.3% | -0.3 | 0.0 | | 3.2 | 40.0% | 0.3 | 0.0 | | 0.4 | 62.9% | 0.1 | 0.0 | 0.0 |
| Model C | 14.3 | 33.3% | 2.4 | 0.0 | | -8.8 | 20.0% | -0.4 | 0.0 | | -0.6 | 9.7% | 0.0 | 0.0 | 0.0 |

FIG. 8B

Past Model Year/30 Days Sales

| Dealer | Diff DTT | Sales% 0.5 | Factor Total | Time Weighted 18.8% | District | Diff DTT | Sales% 0.25 | Factor Total | Time Weighted 15.8% | Region | Diff DTT | Sales% 0.25 | Factor Total | Time Weighted 11.9% | Sub Total |
|---|---|---|---|---|---|---|---|---|---|---|---|---|---|---|---|
| Model A | -6.8 | 54.8% | -1.9 | -0.3 | | 17.0 | 27.5% | 1.2 | 0.2 | | 24.5 | 25.1% | 1.5 | 0.2 | 0.0 |
| Model B | 8.2 | 45.2% | 1.9 | 0.3 | | -3.0 | 67.5% | -0.5 | -0.1 | | -7.5 | 67.5% | -1.3 | -0.2 | 0.1 |
| Model C | 102.2 | 0.0% | 0.0 | 0.0 | | -53.0 | 5.0% | -0.7 | -0.1 | | -14.5 | 7.4% | -0.3 | 0.0 | -0.1 |

Past Model Year/90 Days Sales

| Dealer | Diff DTT | Sales% 0.5 | Factor Total | Time Weighted 65.7% | District | Diff DTT | Sales% 0.25 | Factor Total | Time Weighted 63.1% | Region | Diff DTT | Sales% 0.25 | Factor Total | Time Weighted 55.0% | Sub Total |
|---|---|---|---|---|---|---|---|---|---|---|---|---|---|---|---|
| Model A | -15.6 | 39.1% | -3.1 | -2.0 | | 32.3 | 25.2% | 2.0 | 1.3 | | 27.3 | 25.8% | 1.8 | 1.0 | 0.2 |
| Model B | 7.4 | 57.6% | 2.1 | 1.4 | | -12.7 | 64.8% | -2.1 | -1.3 | | -11.7 | 64.9% | -1.9 | -1.0 | -1.0 |
| Model C | 57.4 | 3.3% | 0.9 | 0.6 | | 1.3 | 10.1% | 0.0 | 0.0 | | 6.3 | 9.3% | 0.1 | 0.1 | 0.7 |

Past Model Year/Full Model Year Sales

| Dealer | Diff DTT | Sales% 0.5 | Factor Total | Time Weighted 9.9% | District | Diff DTT | Sales% 0.25 | Factor Total | Time Weighted 9.8% | Region | Diff DTT | Sales% 0.25 | Factor Total | Time Weighted 9.6% | Sub Total |
|---|---|---|---|---|---|---|---|---|---|---|---|---|---|---|---|
| Model A | -1.3 | 24.7% | -0.2 | 0.0 | | 10.2 | 24.4% | 0.6 | 0.1 | | 14.3 | 22.3% | 0.8 | 0.1 | 0.1 |
| Model B | -0.3 | 63.4% | -0.1 | 0.0 | | -4.8 | 64.3% | -0.8 | -0.1 | | -5.7 | 66.2% | -0.9 | -0.1 | -0.2 |
| Model C | 4.7 | 11.9% | 0.3 | 0.0 | | 5.2 | 11.3% | 0.1 | 0.0 | | 5.3 | 11.6% | 0.2 | 0.0 | 0.1 |

Model A  0.3
Model B  -0.9
Model C  0.7

9. Days On Lot (optional)

Metric Factor  1    Days On Lot=if(Diff DOL<0,Diff DOL*Stock%*Metric Factor*Dealer/District/Region Sizing Factor * Time Factor,0)

901

| Dealer | Factor | 0.33 | Factor | | 100.0% | District | Factor | 0.25 | Factor | | 100.0% | Region | Factor | 0.25 | Factor | | 100.0% | Sub Total |
|---|---|---|---|---|---|---|---|---|---|---|---|---|---|---|---|---|---|---|
|  | Diff DOL | Stock% | Total | Time Weighted | | | Diff DOL | Stock% | Total | Time Weighted | | | Diff DOL | Stock% | Total | Time Weighted | | |
| Model A | 3.5 | 39.0% | 0.0 | 0.0 | | | 14.4 | 28.0% | 0.0 | 0.0 | | | 27.2 | 22.7% | 0.0 | 0.0 | | 0.0 |
| Model B | -4.5 | 52.4% | -0.8 | -0.8 | | | -7.6 | 59.7% | -1.1 | -1.1 | | | -10.8 | 67.9% | -1.8 | -1.8 | | -3.7 |
| Model C | 11.5 | 8.5% | 0.0 | 0.0 | | | 1.4 | 12.3% | 0.0 | 0.0 | | | -9.8 | 9.4% | -0.2 | -0.2 | | -0.2 |

903  902                                                                                                                                904 → Model A  0.0
                                                                                                                                              Model B  -3.7
                                                                                                                                              Model C  -0.2

FIG. 10

10. Total Up The Metrics

| | 5. Sales/Stock Gap | 6. Dealer Inv % vs. Area Sales % | 7. Sales Total % | 8. Days To Turn | 9. Days On Lot | Total |
|---|---|---|---|---|---|---|
| Model A | 18.6 | -2.8 | 9.4 | 0.3 | 0.0 | 25.4 |
| Model B | -6.2 | 3.2 | 18.2 | -0.9 | -3.7 | 10.5 |
| Model C | -12.4 | -0.4 | 2.5 | 0.7 | -0.2 | -9.9 |

Current Model Year/30 Days Sales — 1102

| | DEALER ||||||||||| |
|---|---|---|---|---|---|---|---|---|---|---|---|---|
| | DTT | Diff DTT | Sales | Sales % | DOL | Diff DOL | Stock | Stock % | Pipe | Total | Total % | Order Bank |
| | 55.0 | | 1 | 100% | 83 | | 82 | 100% | 131 | 213 | 100% | 3 |
| Model A | 55 | 0.0 | 1 | 100.0% | 79 | 3.5 | 32 | 39.0% | 27 | 59 | 27.7% | 2 |
| Model B | 0 | 55.0 | 0 | 0.0% | 87 | -4.5 | 43 | 52.4% | 88 | 131 | 61.5% | 1 |
| Model C | 0 | 55.0 | 0 | 0.0% | 71 | 11.5 | 7 | 8.5% | 16 | 23 | 10.8% | 0 |

Current Model Year/90 Days Sales

| | DEALER ||||||||||| |
|---|---|---|---|---|---|---|---|---|---|---|---|---|
| 1103 | DTT | Diff DTT | Sales | Sales % | DOL | Diff DOL | Stock | Stock % | Pipe | Total | Total % | Order Bank |
| | 42.3 | | 3 | 100% | 83 | | 82 | 100% | 131 | 213 | 100% | 3 |
| Model A | 55 | -12.7 | 1 | 33.3% | 79 | 3.5 | 32 | 39.0% | 27 | 59 | 27.7% | 2 |
| Model B | 44 | -1.7 | 1 | 33.3% | 87 | -4.5 | 43 | 52.4% | 88 | 131 | 61.5% | 1 |
| Model C | 28 | 14.3 | 1 | 33.3% | 71 | 11.5 | 7 | 8.5% | 16 | 23 | 10.8% | 0 |

Current Model Year/Full Model Year Sales

| | DEALER ||||||||||| |
|---|---|---|---|---|---|---|---|---|---|---|---|---|
| | DTT | Diff DTT | Sales | Sales % | DOL | Diff DOL | Stock | Stock % | Pipe | Total | Total % | Order Bank |
| | 42.3 | | 3 | 100% | 83 | | 82 | 100% | 131 | 213 | 100% | 3 |
| Model A | 55 | -12.7 | 1 | 33.3% | 79 | 3.5 | 32 | 39.0% | 27 | 59 | 27.7% | 2 |
| Model B | 44 | -1.7 | 1 | 33.3% | 87 | -4.5 | 43 | 52.4% | 88 | 131 | 61.5% | 1 |
| Model C | 28 | 14.3 | 1 | 33.3% | 71 | 11.5 | 7 | 8.5% | 16 | 23 | 10.8% | 0 |

Current Model Year/30 Days Sales

| | DISTRICT |||||||||| |
|---|---|---|---|---|---|---|---|---|---|---|
| | DTT | Diff DTT | Sales | Sales % | DOL | Diff DOL | Stock | Stock % | Total | Total % |
| | 39.0 | | 16 | 100% | 77 | | 382 | 100% | 905 | 100% |
| Model A | 47 | -8.0 | 5 | 31.3% | 63 | 14.4 | 107 | 28.0% | 271 | 29.9% |
| Model B | 31 | 8.0 | 7 | 43.8% | 85 | -7.6 | 228 | 59.7% | 530 | 58.6% |
| Model C | 43 | -4.0 | 4 | 25.0% | 76 | 1.4 | 47 | 12.3% | 104 | 11.5% |

Current Model Year/90 Days Sales

| | DISTRICT |||||||||| |
|---|---|---|---|---|---|---|---|---|---|---|
| | DTT | Diff DTT | Sales | Sales % | DOL | Diff DOL | Stock | Stock % | Total | Total % |
| | 31.2 | | 25 | 100% | 77.4 | | 382 | 100% | 905 | 100% |
| Model A | 30 | 1.2 | 10 | 40.0% | 63 | 14.4 | 107 | 28.0% | 271 | 29.9% |
| Model B | 28 | 3.2 | 10 | 40.0% | 85 | -7.6 | 228 | 59.7% | 530 | 58.6% |
| Model C | 40 | -8.8 | 5 | 20.0% | 76 | 1.4 | 47 | 12.3% | 104 | 11.5% |

Current Model Year/Full Model Year Sales

| | DISTRICT |||||||||| |
|---|---|---|---|---|---|---|---|---|---|---|
| | DTT | Diff DTT | Sales | Sales % | DOL | Diff DOL | Stock | Stock % | Total | Total % |
| | 31.2 | | 25 | 100% | 77.4 | | 382 | 100% | 905 | 100% |
| Model A | 30 | 1.2 | 10 | 40.0% | 63 | 14.4 | 107 | 28.0% | 271 | 29.9% |
| Model B | 28 | 3.2 | 10 | 40.0% | 85 | -7.6 | 228 | 59.7% | 530 | 58.6% |
| Model C | 40 | -8.8 | 5 | 20.0% | 76 | 1.4 | 47 | 12.3% | 104 | 11.5% |

FIG. 11B

Current Model Year/30 Days Sales

| | \multicolumn{9}{c}{REGION} | | | | | | | | |
|---|---|---|---|---|---|---|---|---|---|
| | DTT | Diff DTT | Sales | Sales % | DOL | Diff DOL | Stock | Stock % | Total | Inv % |
| | 35.9 | | 141 | 100% | 92.2 | | 2066 | 100% | 4131 | 100% |
| Model A | 38 | -2.1 | 37 | 26.2% | 65 | 27.2 | 468 | 22.7% | 1159 | 28.1% |
| Model B | 35 | 0.9 | 93 | 66.0% | 103 | -10.8 | 1403 | 67.9% | 2573 | 62.3% |
| Model C | 37 | -1.1 | 11 | 7.8% | 102 | -9.8 | 195 | 9.4% | 399 | 9.7% |

Current Model Year/90 Days Sales

| | \multicolumn{9}{c}{REGION} | | | | | | | | |
|---|---|---|---|---|---|---|---|---|---|
| | DTT | Diff DTT | Sales | Sales % | DOL | Diff DOL | Stock | Stock % | Total | Inv % |
| | 27.4 | | 248 | 100% | 92.2 | | 2066 | 100% | 4131 | 100% |
| Model A | 28 | -0.6 | 68 | 27.4% | 65 | 27.2 | 468 | 22.7% | 1159 | 28.1% |
| Model B | 27 | 0.4 | 156 | 62.9% | 103 | -10.8 | 1403 | 67.9% | 2573 | 62.3% |
| Model C | 28 | -0.6 | 24 | 9.7% | 102 | -9.8 | 195 | 9.4% | 399 | 9.7% |

Current Model Year/Full Model Year Sales

| | \multicolumn{9}{c}{REGION} | | | | | | | | |
|---|---|---|---|---|---|---|---|---|---|
| | DTT | Diff DTT | Sales | Sales % | DOL | Diff DOL | Stock | Stock % | Total | Inv % |
| | 27.4 | | 248 | 100% | 92.2 | | 2066 | 100% | 4131 | 100% |
| Model A | 28 | -0.6 | 68 | 27.4% | 65 | 27.2 | 468 | 22.7% | 1159 | 28.1% |
| Model B | 27 | 0.4 | 156 | 62.9% | 103 | -10.8 | 1403 | 67.9% | 2573 | 62.3% |
| Model C | 28 | -0.6 | 24 | 9.7% | 102 | -9.8 | 195 | 9.4% | 399 | 9.7% |

Past Model Year/30 Days Sales

| | \multicolumn{11}{c}{DEALER} | | | | | | | | | | | |
|---|---|---|---|---|---|---|---|---|---|---|---|---|
| | DTT | Diff DTT | Sales | Sales % | DOL | Diff DOL | Stock | Stock % | Pipe | Total | Total % | Order Bank |
| | 102.2 | | 31 | 100% | 83 | | 82 | 100% | 131 | 213 | 100% | 3 |
| Model A | 109 | -6.8 | 17 | 54.8% | 79 | 3.5 | 32 | 39.0% | 27 | 59 | 27.7% | 2 |
| Model B | 94 | 8.2 | 14 | 45.2% | 87 | -4.5 | 43 | 52.4% | 88 | 131 | 61.5% | 1 |
| Model C | 0 | 102.2 | 0 | 0.0% | 71 | 11.5 | 7 | 8.5% | 16 | 23 | 10.8% | 0 |

Past Model Year/90 Days Sales

| | \multicolumn{11}{c}{DEALER} | | | | | | | | | | | |
|---|---|---|---|---|---|---|---|---|---|---|---|---|
| | DTT | Diff DTT | Sales | Sales % | DOL | Diff DOL | Stock | Stock % | Pipe | Total | Total % | Order Bank |
| 1104 | 78.4 | | 92 | 100% | 83 | | 82 | 100% | 131 | 213 | 100% | 3 |
| Model A | 94 | -15.6 | 36 | 39.1% | 79 | 3.5 | 32 | 39.0% | 27 | 59 | 27.7% | 2 |
| Model B | 71 | 7.4 | 53 | 57.6% | 87 | -4.5 | 43 | 52.4% | 88 | 131 | 61.5% | 1 |
| Model C | 21 | 57.4 | 3 | 3.3% | 71 | 11.5 | 7 | 8.5% | 16 | 23 | 10.8% | 0 |

Past Model Year/Full Model Year Sales

| | \multicolumn{11}{c}{DEALER} | | | | | | | | | | | |
|---|---|---|---|---|---|---|---|---|---|---|---|---|
| | DTT | Diff DTT | Sales | Sales % | DOL | Diff DOL | Stock | Stock % | Pipe | Total | Inv % | Order Bank |
| | 48.7 | | 612 | 100% | 83 | | 82 | 100% | 131 | 213 | 100% | 3 |
| Model A | 50 | -1.3 | 151 | 24.7% | 79 | 3.5 | 32 | 39.0% | 27 | 59 | 27.7% | 2 |
| Model B | 49 | -0.3 | 388 | 63.4% | 87 | -4.5 | 43 | 52.4% | 88 | 131 | 61.5% | 1 |
| Model C | 44 | 4.7 | 73 | 11.9% | 71 | 11.5 | 7 | 8.5% | 16 | 23 | 10.8% | 0 |

FIG. 11C

| Past Model Year/30 Days Sales | | | | | | | | | | |
|---|---|---|---|---|---|---|---|---|---|---|
| | DISTRICT | | | | | | | | | |
| | DTT | Diff DTT | Sales | Sales % | DOL | Diff DOL | Stock | Stock % | Total | Total % |
| | 89.0 | | 120 | 100% | 77 | | 382 | 100% | 905 | 100% |
| Model A | 72 | 17.0 | 33 | 27.5% | 63 | 14.4 | 107 | 28.0% | 271 | 29.9% |
| Model B | 92 | -3.0 | 81 | 67.5% | 85 | -7.6 | 228 | 59.7% | 530 | 58.6% |
| Model C | 142 | -53.0 | 6 | 5.0% | 76 | 1.4 | 47 | 12.3% | 104 | 11.5% |

| Past Model Year/90 Days Sales | | | | | | | | | | |
|---|---|---|---|---|---|---|---|---|---|---|
| | DISTRICT | | | | | | | | | |
| | DTT | Diff DTT | Sales | Sales % | DOL | Diff DOL | Stock | Stock % | Total | Total % |
| | 90.3 | | 457 | 100% | 77.4 | | 382 | 100% | 905 | 100% |
| Model A | 58 | 32.3 | 115 | 25.2% | 63 | 14.4 | 107 | 28.0% | 271 | 29.9% |
| Model B | 103 | -12.7 | 296 | 64.8% | 85 | -7.6 | 228 | 59.7% | 530 | 58.6% |
| Model C | 89 | 1.3 | 46 | 10.1% | 76 | 1.4 | 47 | 12.3% | 104 | 11.5% |

| Past Model Year/Full Model Year Sales | | | | | | | | | | |
|---|---|---|---|---|---|---|---|---|---|---|
| | DISTRICT | | | | | | | | | |
| | DTT | Diff DTT | Sales | Sales % | DOL | Diff DOL | Stock | Stock % | Total | Total % |
| | 52.2 | | 2885 | 100% | 77.4 | | 382 | 100% | 905 | 100% |
| Model A | 42 | 10.2 | 704 | 24.4% | 63 | 14.4 | 107 | 28.0% | 271 | 29.9% |
| Model B | 57 | -4.8 | 1856 | 64.3% | 85 | -7.6 | 228 | 59.7% | 530 | 58.6% |
| Model C | 47 | 5.2 | 325 | 11.3% | 76 | 1.4 | 47 | 12.3% | 104 | 11.5% |

| Past Model Year/30 Days Sales | | | | | | | | | | |
|---|---|---|---|---|---|---|---|---|---|---|
| | REGION | | | | | | | | | |
| | DTT | Diff DTT | Sales | Sales % | DOL | Diff DOL | Stock | Stock % | Total | Inv % |
| | 101.5 | | 418 | 100% | 92.2 | | 2066 | 100% | 4131 | 100% |
| Model A | 77 | 24.5 | 105 | 25.1% | 65 | 27.2 | 468 | 22.7% | 1159 | 28.1% |
| Model B | 109 | -7.5 | 282 | 67.5% | 103 | -10.8 | 1403 | 67.9% | 2573 | 62.3% |
| Model C | 116 | -14.5 | 31 | 7.4% | 102 | -9.8 | 195 | 9.4% | 399 | 9.7% |

| Current Model Year/90 Days Sales | | | | | | | | | | |
|---|---|---|---|---|---|---|---|---|---|---|
| | REGION | | | | | | | | | |
| | DTT | Diff DTT | Sales | Sales % | DOL | Diff DOL | Stock | Stock % | Total | Inv % |
| | 99.3 | | 1815 | 100% | 92.2 | | 2066 | 100% | 4131 | 100% |
| Model A | 72 | 27.3 | 468 | 25.8% | 65 | 27.2 | 468 | 22.7% | 1159 | 28.1% |
| Model B | 111 | -11.7 | 1178 | 64.9% | 103 | -10.8 | 1403 | 67.9% | 2573 | 62.3% |
| Model C | 93 | 6.3 | 169 | 9.3% | 102 | -9.8 | 195 | 9.4% | 399 | 9.7% |

| Past Model Year/Full Model Year Sales | | | | | | | | | | |
|---|---|---|---|---|---|---|---|---|---|---|
| | REGION | | | | | | | | | |
| | DTT | Diff DTT | Total | Sales % | DOL | Diff DOL | Stock | Stock % | Total | Inv % |
| | 66.3 | | 11445 | 100% | 92.2 | | 2066 | 100% | 4131 | 100% |
| Model A | 52 | 14.3 | 2549 | 22.3% | 65 | 27.2 | 468 | 22.7% | 1159 | 28.1% |
| Model B | 72 | -5.7 | 7572 | 66.2% | 103 | -10.8 | 1403 | 67.9% | 2573 | 62.3% |
| Model C | 61 | 5.3 | 1324 | 11.6% | 102 | -9.8 | 195 | 9.4% | 399 | 9.7% |

FIG. 12CA
5. Sales/Stock Gap
Metric Factor 100

Time Weighted Factor=(Sales%-Factored Inventory%)*Metric Factor*Dealer/District/Region Sizing Factor*Time Factor

Current Model Year/30 Days Sales

| | Dealer | | | | | | District | | | | | | | Region | | | | | | |
|---|---|---|---|---|---|---|---|---|---|---|---|---|---|---|---|---|---|---|---|---|
| | Sales % | Sizing Factor | 0.75 | | Time Factor | 2.1% | | Sales % | Sizing Factor | 0.75 | | Time Factor | 4.7% | | Sales % | Sizing Factor | 0.75 | | Time Factor | 8.3% |
| | | Factored Inv Total % (see 4) | Gap | Total | | Time Weighted Total | | | Inv Total % | Gap | Total | | Time Weighted Total | | | Inv Total % | Gap | Total | | Time Weighted Total | Sub Total |
| Package A | 100.0% | 83.9% | 16.1% | 12.1 | | 0.3 | | 80.0% | 77.5% | 2.5% | 1.9 | | 0.1 | | 81.1% | 77.0% | 4.1% | 3.1 | | 0.3 | 0.6 |
| Package B | 0.0% | 11.7% | -11.7% | -8.8 | | -0.2 | | 0.0% | 15.9% | -15.9% | -11.9 | | -0.6 | | 10.8% | 15.5% | -4.7% | -3.5 | | -0.3 | -1.0 |
| Package C | 0.0% | 4.4% | -4.4% | -3.3 | | -0.1 | | 20.0% | 6.6% | 13.4% | 10.0 | | 0.5 | | 8.1% | 7.5% | 0.6% | 0.5 | | 0.0 | 0.4 |

Current Model Year/90 Days Sales

| | Dealer | | | | | | District | | | | | | | Region | | | | | | |
|---|---|---|---|---|---|---|---|---|---|---|---|---|---|---|---|---|---|---|---|---|
| | Sales % | Sizing Factor | 0.75 | | Time Factor | 3.7% | | Sales % | Sizing Factor | 0.75 | | Time Factor | 10.4% | | Sales % | Sizing Factor | 0.75 | | Time Factor | 15.8% |
| | | Factored Inv Total % (see 4) | Gap | Total | | Time Weighted Total | | | Inv Total % | Gap | Total | | Time Weighted Total | | | Inv Total % | Gap | Total | | Time Weighted Total | Sub Total |
| Package A | 100.0% | 83.9% | 16.1% | 12.1 | | 0.4 | | 80.0% | 77.5% | 2.5% | 1.9 | | 0.2 | | 85.3% | 77.0% | 8.3% | 6.2 | | 1.0 | 1.6 |
| Package B | 0.0% | 11.7% | -11.7% | -8.8 | | -0.3 | | 10.0% | 15.9% | -5.9% | -4.4 | | -0.5 | | 8.8% | 15.5% | -6.7% | -5.0 | | -0.8 | -1.6 |
| Package C | 0.0% | 4.4% | -4.4% | -3.3 | | -0.1 | | 10.0% | 6.6% | 3.4% | 2.5 | | 0.3 | | 5.9% | 7.5% | -1.6% | -1.2 | | -0.2 | -0.1 |

Current Model Year/Full Model Year Sales

| | Dealer | | | | | | District | | | | | | | Region | | | | | | |
|---|---|---|---|---|---|---|---|---|---|---|---|---|---|---|---|---|---|---|---|---|
| | Sales % | Sizing Factor | 0.75 | | Time Factor | 0.1% | | Sales % | Sizing Factor | 0.75 | | Time Factor | 0.3% | | Sales % | Sizing Factor | 0.75 | | Time Factor | 0.5% |
| | | Factored Inv Total % (see 4) | Gap | Total | | Time Weighted Total | | | Inv Total % | Gap | Total | | Time Weighted Total | | | Inv Total % | Gap | Total | | Time Weighted Total | Sub Total |
| Package A | 100.0% | 83.9% | 16.1% | 12.1 | | 0.0 | | 80.0% | 77.5% | 2.5% | 1.9 | | 0.0 | | 85.3% | 77.0% | 8.3% | 6.2 | | 0.0 | 0.1 |
| Package B | 0.0% | 11.7% | -11.7% | -8.8 | | 0.0 | | 10.0% | 15.9% | -5.9% | -4.4 | | 0.0 | | 8.8% | 15.5% | -6.7% | -5.0 | | 0.0 | 0.0 |
| Package C | 0.0% | 4.4% | -4.4% | -3.3 | | 0.0 | | 10.0% | 6.6% | 3.4% | 2.5 | | 0.0 | | 5.9% | 7.5% | -1.6% | -1.2 | | 0.0 | 0.0 |

FIG. 12CB

Past Model Year/30 Days Sales

| | Dealer | Sizing Factor | | Time | | | | District | Sizing Factor | | Time | | | | Region | Sizing Factor | | Time | | | |
|---|---|---|---|---|---|---|---|---|---|---|---|---|---|---|---|---|---|---|---|---|---|
| | Sales % | Factored Inv Total % (see 4) | 0.75 Gap | Factor Total | 17.9% Time Weighted Total | | | Sales % | Inv Total % | 0.75 Gap | Factor Total | 15.3% Time Weighted Total | | | Sales % | Inv Total % | 0.75 Gap | Factor Total | 11.7% Time Weighted Total | Sub Total |
| Package A | 82.4% | 83.9% | -1.5% | -1.1 | -0.2 | | | 57.6% | 77.5% | -19.9% | -14.9 | -2.3 | | | 71.4% | 77.0% | -5.5% | -4.2 | -0.5 | -3.0 |
| Package B | 17.6% | 11.7% | 6.0% | 4.5 | 0.8 | | | 24.2% | 15.9% | 8.4% | 6.3 | 1.0 | | | 17.1% | 15.5% | 1.6% | 1.2 | 0.1 | 1.9 |
| Package C | 0.0% | 4.4% | -4.4% | -3.3 | -0.6 | | | 18.2% | 6.6% | 11.5% | 8.7 | 1.3 | | | 11.4% | 7.5% | 3.9% | 2.9 | 0.3 | 1.1 |

Past Model Year/90 Days Sales

| | Dealer | Sizing Factor | | Time | | | | District | Sizing Factor | | Time | | | | Region | Sizing Factor | | Time | | | |
|---|---|---|---|---|---|---|---|---|---|---|---|---|---|---|---|---|---|---|---|---|---|
| | Sales % | Factored Inv Total % (see 4) | 0.75 Gap | Factor Total | 66.3% Time Weighted Total | | | Sales % | Inv Total % | 0.75 Gap | Factor Total | 59.6% Time Weighted Total | | | Sales % | Inv Total % | 0.75 Gap | Factor Total | 54.2% Time Weighted Total | Sub Total |
| Package A | 75.0% | 83.9% | -8.9% | -6.7 | -4.4 | | | 65.2% | 77.5% | -12.3% | -9.2 | -5.5 | | | 72.0% | 77.0% | -5.0% | -3.7 | -2.0 | -11.9 |
| Package B | 16.7% | 11.7% | 5.0% | 3.7 | 2.5 | | | 19.1% | 15.9% | 3.3% | 2.4 | 1.5 | | | 17.9% | 15.5% | 2.4% | 1.8 | 1.0 | 4.9 |
| Package C | 8.3% | 4.4% | 3.9% | 2.9 | 1.9 | | | 15.7% | 6.6% | 9.0% | 6.8 | 4.0 | | | 10.0% | 7.5% | 2.5% | 1.9 | 1.0 | 7.0 |

Past Model Year/Full Model Year Sales

| | Dealer | Sizing Factor | | Time | | | | District | Sizing Factor | | Time | | | | Region | Sizing Factor | | Time | | | |
|---|---|---|---|---|---|---|---|---|---|---|---|---|---|---|---|---|---|---|---|---|---|
| | Sales % | Factored Inv Total % (see 4) | 0.75 Gap | Factor Total | 9.9% Time Weighted Total | | | Sales % | Inv Total % | 0.75 Gap | Factor Total | 9.7% Time Weighted Total | | | Sales % | Inv Total % | 0.75 Gap | Factor Total | 9.5% Time Weighted Total | Sub Total |
| Package A | 76.2% | 83.9% | -7.7% | -5.8 | -0.6 | | | 70.9% | 77.5% | -6.6% | -5.0 | -0.5 | | | 69.6% | 77.0% | -7.3% | -5.5 | -0.5 | -1.6 |
| Package B | 15.9% | 11.7% | 4.2% | 3.2 | 0.3 | | | 18.9% | 15.9% | 3.0% | 2.3 | 0.2 | | | 18.5% | 15.5% | 3.0% | 2.2 | 0.2 | 0.7 |
| Package C | 7.9% | 4.4% | 3.5% | 2.6 | 0.3 | | | 10.2% | 6.6% | 3.6% | 2.7 | 0.3 | | | 11.8% | 7.5% | 4.3% | 3.3 | 0.3 | 0.8 |

| | |
|---|---|
| Package A | -14.2 |
| Package B | 4.9 |
| Package C | 9.3 |

FIG. 12DA

6. Dealer Inv % vs. Area Sales %

Metric Factor  100

Time Weighted Factor=(Sales%−Factored Dealer Inventory%)*Metric Factor*District/Region Sizing Factor*Time Factor

Current Model Year/30 Days Sales

| | Dealer | | | Time Factor 0 | | | District | Sizing Factor 0.66 | | | Time Factor 4.7% | | | Region | Sizing Factor 0.75 | | | Time Factor 8.3% | | Sub Total |
|---|---|---|---|---|---|---|---|---|---|---|---|---|---|---|---|---|---|---|---|---|
| | Sales % | Sizing Factor | Dealer Factored Inv Total | Gap | Total | Time Weighted Total 2.1% | | Sales % | Dealer Factored d Inv | Gap | Total | Time Weighted Total | | Sales % | Dealer Factored d Inv | Gap | Total | Time Weighted Total | |
| Package A | | | | | | | | 80.0% | 83.9% | -3.9% | -2.6 | -0.1 | | 81.1% | 83.9% | -2.8% | -2.1 | -0.2 | -0.3 |
| Package B | | | | | | | | 0.0% | 11.7% | -11.7% | -7.7 | -0.4 | | 10.8% | 11.7% | -0.9% | -0.7 | -0.1 | -0.4 |
| Package C | | | | | | | | 20.0% | 4.4% | 15.6% | 10.3 | 0.5 | | 8.1% | 4.4% | 3.7% | 2.8 | 0.2 | 0.7 |

Current Model Year/90 Days Sales

| | Dealer | | | Time Factor 0 | | | District | Sizing Factor 0.66 | | | Time Factor 10.4% | | | Region | Sizing Factor 0.75 | | | Time Factor 15.8% | | Sub Total |
|---|---|---|---|---|---|---|---|---|---|---|---|---|---|---|---|---|---|---|---|---|
| | Sales % | Sizing Factor | Dealer Factored Inv Total | Gap | Total | Time Weighted Total 3.7% | | Sales % | Dealer Factored d Inv | Gap | Total | Time Weighted Total | | Sales % | Dealer Factored d Inv | Gap | Total | Time Weighted Total | |
| Package A | | | | | | | | 80.0% | 83.9% | -3.9% | -2.6 | -0.3 | | 85.3% | 83.9% | 1.4% | 1.1 | 0.2 | -0.1 |
| Package B | | | | | | | | 10.0% | 11.7% | -1.7% | -1.1 | -0.1 | | 8.8% | 11.7% | -2.9% | -2.1 | -0.3 | -0.5 |
| Package C | | | | | | | | 10.0% | 4.4% | 5.6% | 3.7 | 0.4 | | 5.9% | 4.4% | 1.4% | 1.1 | 0.2 | 0.6 |

Current Model Year/Full Model Year Sales

| | Dealer | | | Time Factor 0 | | | District | Sizing Factor 0.66 | | | Time Factor 0.3% | | | Region | Sizing Factor 0.75 | | | Time Factor 0.5% | | Sub Total |
|---|---|---|---|---|---|---|---|---|---|---|---|---|---|---|---|---|---|---|---|---|
| | Sales % | Sizing Factor | Dealer Factored Inv Total | Gap | Total | Time Weighted Total 0.1% | | Sales % | Dealer Factored d Inv | Gap | Total | Time Weighted Total | | Sales % | Dealer Factored d Inv | Gap | Total | Time Weighted Total | |
| Package A | | | | | | | | 80.0% | 83.9% | -3.9% | -2.6 | 0.0 | | 85.3% | 83.9% | 1.4% | 1.1 | 0.0 | 0.0 |
| Package B | | | | | | | | 10.0% | 11.7% | -1.7% | -1.1 | 0.0 | | 8.8% | 11.7% | -2.9% | -2.1 | 0.0 | 0.0 |
| Package C | | | | | | | | 10.0% | 4.4% | 5.6% | 3.7 | 0.0 | | 5.9% | 4.4% | 1.4% | 1.1 | 0.0 | 0.0 |

FIG. 12DB

Past Model Year/30 Days Sales

| Dealer | Sizing Factor | 0 | Time Factor | 17.9% Time Weighted Total | District | Sizing Factor | 0.66 | Time Factor | 15.3% Time Weighted Total | Region | Sizing Factor | 0.75 | Time Factor | 11.7% Time Weighted Total | Sub Total |
|---|---|---|---|---|---|---|---|---|---|---|---|---|---|---|---|
| | Sales % | Dealer Factored Inv Total | Gap | Total | | Sales % | Dealer Factored Inv Total | Gap | Total | | Sales % | Dealer Factored Inv Total | Gap | Total | |
| Package A | | | | | | 57.6% | 83.9% | -26.3% | -17.4 | -2.7 | | 71.4% | 83.9% | -12.5% | -9.3 | -1.1 | -3.8 |
| Package B | | | | | | 24.2% | 11.7% | 12.6% | 8.3 | 1.3 | | 17.1% | 11.7% | 5.5% | 4.1 | 0.5 | 1.8 |
| Package C | | | | | | 18.2% | 4.4% | 13.7% | 9.1 | 1.4 | | 11.4% | 4.4% | 7.0% | 5.2 | 0.6 | 2.0 |

Past Model Year/90 Days Sales

| Dealer | Sizing Factor | 0 | Time Factor | 66.3% Time Weighted Total | District | Sizing Factor | 0.66 | Time Factor | 59.6% Time Weighted Total | Region | Sizing Factor | 0.75 | Time Factor | 54.2% Time Weighted Total | Sub Total |
|---|---|---|---|---|---|---|---|---|---|---|---|---|---|---|---|
| | Sales % | Dealer Factored Inv Total | Gap | Total | | Sales % | Dealer Factored Inv Total | Gap | Total | | Sales % | Dealer Factored Inv Total | Gap | Total | |
| Package A | | | | | | 65.2% | 83.9% | -18.7% | -12.3 | -7.3 | | 72.0% | 83.9% | -11.9% | -8.9 | -4.8 | -12.2 |
| Package B | | | | | | 19.1% | 11.7% | 7.4% | 4.9 | 2.9 | | 17.9% | 11.7% | 6.3% | 4.7 | 2.5 | 5.5 |
| Package C | | | | | | 15.7% | 4.4% | 11.2% | 7.4 | 4.4 | | 10.0% | 4.4% | 5.6% | 4.2 | 2.3 | 6.7 |

Past Model Year/Full Model Year Sales

| Dealer | Sizing Factor | 0 | Time Factor | 9.9% Time Weighted Total | District | Sizing Factor | 0.66 | Time Factor | 9.7% Time Weighted Total | Region | Sizing Factor | 0.75 | Time Factor | 9.5% Time Weighted Total | Sub Total |
|---|---|---|---|---|---|---|---|---|---|---|---|---|---|---|---|
| | Sales % | Dealer Factored Inv Total | Gap | Total | | Sales % | Dealer Factored Inv Total | Gap | Total | | Sales % | Dealer Factored Inv Total | Gap | Total | |
| Package A | | | | | | 70.9% | 83.9% | -13.0% | -8.6 | -0.8 | | 69.6% | 83.9% | -14.2% | -10.7 | -1.0 | -1.8 |
| Package B | | | | | | 18.9% | 11.7% | 7.2% | 4.8 | 0.5 | | 18.5% | 11.7% | 6.8% | 5.1 | 0.5 | 0.9 |
| Package C | | | | | | 10.2% | 4.4% | 5.8% | 3.8 | 0.4 | | 11.8% | 4.4% | 7.4% | 5.6 | 0.5 | 0.9 |

Package A  -18.2
Package B    7.3
Package C   10.9

FIG. 12EA

7. Sales Total % (optional)
Metric Factor  10

Time Weighted Total=Sales%*Metric Factor*Dealer/District/Region Sizing Factor* Time Factor

Current Model Year/30 Days Sales

| | Dealer | Sizing Factor | Sales% | Time Factor 0.25 | Total | Time Weighted Total 2.1% | District | Sizing Factor | Sales% | Time Factor 0.33 | Total | Time Weighted Total 4.7% | Region | Sizing Factor | Sales% | Time Factor 0.33 | Total | Time Weighted Total 8.3% | Sub Total |
|---|---|---|---|---|---|---|---|---|---|---|---|---|---|---|---|---|---|---|---|
| Package A | | | 100.0% | | 2.5 | 0.1 | | | 80.0% | | 2.6 | 0.1 | | | 81.1% | | 2.7 | 0.2 | 0.4 |
| Package B | | | 0.0% | | 0.0 | 0.0 | | | 0.0% | | 0.0 | 0.0 | | | 10.8% | | 0.4 | 0.0 | 0.0 |
| Package C | | | 0.0% | | 0.0 | 0.0 | | | 20.0% | | 0.7 | 0.0 | | | 8.1% | | 0.3 | 0.0 | 0.1 |

Current Model Year/90 Days Sales

| | Dealer | Sizing Factor | Sales% | Time Factor 0.25 | Total | Time Weighted Total 3.7% | District | Sizing Factor | Sales% | Time Factor 0.33 | Total | Time Weighted Total 10.4% | Region | Sizing Factor | Sales% | Time Factor 0.33 | Total | Time Weighted Total 15.8% | Sub Total |
|---|---|---|---|---|---|---|---|---|---|---|---|---|---|---|---|---|---|---|---|
| Package A | | | 100.0% | | 2.5 | 0.1 | | | 80.0% | | 2.6 | 0.3 | | | 85.3% | | 2.8 | 0.4 | 0.8 |
| Package B | | | 0.0% | | 0.0 | 0.0 | | | 10.0% | | 0.3 | 0.0 | | | 8.8% | | 0.3 | 0.0 | 0.1 |
| Package C | | | 0.0% | | 0.0 | 0.0 | | | 10.0% | | 0.3 | 0.0 | | | 5.9% | | 0.2 | 0.0 | 0.1 |

Current Model Year/Full Model Year Sales

| | Dealer | Sizing Factor | Sales% | Time Factor 0.25 | Total | Time Weighted Total 0.1% | District | Sizing Factor | Sales% | Time Factor 0.33 | Total | Time Weighted Total 0.3% | Region | Sizing Factor | Sales% | Time Factor 0.33 | Total | Time Weighted Total 0.5% | Sub Total |
|---|---|---|---|---|---|---|---|---|---|---|---|---|---|---|---|---|---|---|---|
| Package A | | | 100.0% | | 2.5 | 0.0 | | | 80.0% | | 2.6 | 0.0 | | | 85.3% | | 2.8 | 0.0 | 0.0 |
| Package B | | | 0.0% | | 0.0 | 0.0 | | | 10.0% | | 0.3 | 0.0 | | | 8.8% | | 0.3 | 0.0 | 0.0 |
| Package C | | | 0.0% | | 0.0 | 0.0 | | | 10.0% | | 0.3 | 0.0 | | | 5.9% | | 0.2 | 0.0 | 0.0 |

FIG. 12EB

Past Model Year/30 Days Sales

| Dealer | Sizing Factor | Time | | | District | Sizing Factor | Time | | | Region | Sizing Factor | Time | | |
|---|---|---|---|---|---|---|---|---|---|---|---|---|---|---|
| | 0.25 | Factor | Total | Time Weighted Total 17.9% | | 0.33 | Factor | Total | Time Weighted Total 15.3% | | 0.33 | Factor | Total | Time Weighted Total 11.7% |
| | Sales% | Total | | | | Sales% | Total | | | | Sales% | Total | | |
| Package A | 82.4% | 2.1 | 0.4 | | | 57.6% | 1.9 | 0.3 | | | 71.4% | 2.4 | 0.3 | | Sub Total 0.9 |
| Package B | 17.6% | 0.4 | 0.1 | | | 24.2% | 0.8 | 0.1 | | | 17.1% | 0.6 | 0.1 | | 0.3 |
| Package C | 0.0% | 0.0 | 0.0 | | | 18.2% | 0.6 | 0.1 | | | 11.4% | 0.4 | 0.0 | | 0.1 |

Past Model Year/90 Days Sales

| Dealer | Sizing Factor | Time | | | District | Sizing Factor | Time | | | Region | Sizing Factor | Time | | |
|---|---|---|---|---|---|---|---|---|---|---|---|---|---|---|
| | 0.25 | Factor | Total | Time Weighted Total 66.3% | | 0.33 | Factor | Total | Time Weighted Total 59.6% | | 0.33 | Factor | Total | Time Weighted Total 54.2% |
| | Sales% | Total | | | | Sales% | Total | | | | Sales% | Total | | |
| Package A | 75.0% | 1.9 | 1.2 | | | 65.2% | 2.2 | 1.3 | | | 72.0% | 5.4 | 2.9 | | Sub Total 5.5 |
| Package B | 16.7% | 0.4 | 0.3 | | | 19.1% | 0.6 | 0.4 | | | 17.9% | 1.3 | 0.7 | | 1.4 |
| Package C | 8.3% | 0.2 | 0.1 | | | 15.7% | 0.5 | 0.3 | | | 10.0% | 0.8 | 0.4 | | 0.9 |

Past Model Year/Full Model Year Sales

| Dealer | Sizing Factor | Time | | | District | Sizing Factor | Time | | | Region | Sizing Factor | Time | | |
|---|---|---|---|---|---|---|---|---|---|---|---|---|---|---|
| | 0.25 | Factor | Total | Time Weighted Total 9.9% | | 0.33 | Factor | Total | Time Weighted Total 9.7% | | 0.33 | Factor | Total | Time Weighted Total 9.5% |
| | Sales% | Total | | | | Sales% | Total | | | | Sales% | Total | | |
| Package A | 76.2% | 1.9 | 0.2 | | | 70.9% | 2.3 | 0.2 | | | 69.6% | 2.3 | 0.2 | | Sub Total 0.6 |
| Package B | 15.9% | 0.4 | 0.0 | | | 18.9% | 0.6 | 0.1 | | | 18.5% | 0.6 | 0.1 | | 0.2 |
| Package C | 7.9% | 0.2 | 0.0 | | | 10.2% | 0.3 | 0.0 | | | 11.8% | 0.4 | 0.0 | | 0.1 |

Package A    8.3
Package B    1.9
Package C    1.2

FIG. 12.FA

8. Days To Turn
Metric Factor  1

Time Weighted Total=Diff DTT*Sales%*Metric Factor*Dealer/District/Region Sizing Factor*Time Factor

Current Model Year/30 Days Sales

| Dealer | Sizing Factor 0.5 | | Time Factor | | 2.1% | District | Sizing Factor 0.5 | | Time Factor | | 4.7% | Region | Sizing Factor 0.5 | | Time Factor | | 8.3% |
|---|---|---|---|---|---|---|---|---|---|---|---|---|---|---|---|---|---|
| | Diff DTT | Sales% | Total | Time Weighted Total | | | Diff DTT | Sales% | Total | Time Weighted Total | | | Diff DTT | Sales% | Total | Time Weighted Total | Sub Total |
| Package A | 0.0 | 100.0% | 0.0 | 0.0 | | | -1.0 | 80.0% | -0.4 | 0.0 | | | -0.7 | 81.1% | -0.3 | 0.0 | 0.0 |
| Package B | 55.0 | 0.0% | 0.0 | 0.0 | | | 47.0 | 0.0% | 0.0 | 0.0 | | | 4.3 | 10.8% | 0.2 | 0.0 | 0.0 |
| Package C | 55.0 | 0.0% | 0.0 | 0.0 | | | 4.0 | 20.0% | 0.4 | 0.0 | | | 1.3 | 8.1% | 0.1 | 0.0 | 0.0 |

Current Model Year/90 Days Sales

| Dealer | Sizing Factor 0.5 | | Time Factor | | 3.7% | District | Sizing Factor 0.5 | | Time Factor | | 10.4% | Region | Sizing Factor 0.5 | | Time Factor | | 15.8% |
|---|---|---|---|---|---|---|---|---|---|---|---|---|---|---|---|---|---|
| | Diff DTT | Sales% | Total | Time Weighted Total | | | Diff DTT | Sales% | Total | Time Weighted Total | | | Diff DTT | Sales% | Total | Time Weighted Total | Sub Total |
| Package A | 0.0 | 100.0% | 0.0 | 0.0 | | | -1.0 | 80.0% | -0.4 | 0.0 | | | 0.0 | 85.3% | 0.0 | 0.0 | 0.0 |
| Package B | 55.0 | 0.0% | 0.0 | 0.0 | | | 0.0 | 10.0% | 0.0 | 0.0 | | | 1.0 | 8.8% | 0.0 | 0.0 | 0.0 |
| Package C | 55.0 | 0.0% | 0.0 | 0.0 | | | 8.0 | 10.0% | 0.4 | 0.0 | | | -1.0 | 5.9% | 0.0 | 0.0 | 0.0 |

Current Model Year/Full Model Year Sales

| Dealer | Sizing Factor 0.5 | | Time Factor | | 0.1% | District | Sizing Factor 0.5 | | Time Factor | | 0.3% | Region | Sizing Factor 0.5 | | Time Factor | | 0.5% |
|---|---|---|---|---|---|---|---|---|---|---|---|---|---|---|---|---|---|
| | Diff DTT | Sales% | Total | Time Weighted Total | | | Diff DTT | Sales% | Total | Time Weighted Total | | | Diff DTT | Sales% | Total | Time Weighted Total | Sub Total |
| Package A | 0.0 | 100.0% | 0.0 | 0.0 | | | -1.0 | 80.0% | -0.4 | 0.0 | | | 0.0 | 85.3% | 0.0 | 0.0 | 0.0 |
| Package B | 55.0 | 0.0% | 0.0 | 0.0 | | | 0.0 | 10.0% | 0.0 | 0.0 | | | 1.0 | 8.8% | 0.0 | 0.0 | 0.0 |
| Package C | 55.0 | 0.0% | 0.0 | 0.0 | | | 8.0 | 10.0% | 0.4 | 0.0 | | | -1.0 | 5.9% | 0.0 | 0.0 | 0.0 |

FIG. 12FB

Past Model Year/30 Days Sales

| | Dealer | Sizing Factor | Sales% 0.5 | Time Factor Total | Time Weighted Total 17.9% | District | Sizing Factor | Sales% 0.5 | Time Factor Total | Time Weighted Total 15.3% | Region | Sizing Factor | Sales% 0.5 | Time Factor Total | Time Weighted Total 11.7% | Sub Total |
|---|---|---|---|---|---|---|---|---|---|---|---|---|---|---|---|---|
| | | Diff DTT | | | | | Diff DTT | | | | | Diff DTT | | | | |
| Package A | | -2.1 | 82.4% | -0.9 | -0.2 | | -2.1 | 57.6% | -0.6 | -0.1 | | 0.1 | 71.4% | 0.0 | 0.0 | -0.2 |
| Package B | | 9.9 | 17.6% | 0.9 | 0.2 | | -1.1 | 24.2% | -0.1 | 0.0 | | -9.9 | 17.1% | -0.8 | -0.1 | 0.0 |
| Package C | | 108.9 | 0.0% | 0.0 | 0.0 | | 7.9 | 18.2% | 0.7 | 0.1 | | 14.1 | 11.4% | 0.8 | 0.1 | 0.2 |

Past Model Year/90 Days Sales

| | Dealer | Sizing Factor | Sales% 0.5 | Time Factor Total | Time Weighted Total 66.3% | District | Sizing Factor | Sales% 0.5 | Time Factor Total | Time Weighted Total 59.6% | Region | Sizing Factor | Sales% 0.5 | Time Factor Total | Time Weighted Total 54.2% | Sub Total |
|---|---|---|---|---|---|---|---|---|---|---|---|---|---|---|---|---|
| | | Diff DTT | | | | | Diff DTT | | | | | Diff DTT | | | | |
| Package A | | -6.0 | 75.0% | -2.3 | -1.5 | | 0.0 | 65.2% | 0.0 | 0.0 | | 2.0 | 72.0% | 0.7 | 0.4 | -1.1 |
| Package B | | 0.0 | 16.7% | 0.0 | 0.0 | | -9.0 | 19.1% | -0.9 | -0.5 | | -18.0 | 17.9% | -1.6 | -0.9 | -1.4 |
| Package C | | 54.0 | 8.3% | 2.3 | 1.5 | | 11.0 | 15.7% | 0.9 | 0.5 | | 18.0 | 10.0% | 0.9 | 0.5 | 2.5 |

Past Model Year/Full Model Year Sales

| | Dealer | Sizing Factor | Sales% 0.5 | Time Factor Total | Time Weighted Total 9.9% | District | Sizing Factor | Sales% 0.5 | Time Factor Total | Time Weighted Total 9.7% | Region | Sizing Factor | Sales% 0.5 | Time Factor Total | Time Weighted Total 9.5% | Sub Total |
|---|---|---|---|---|---|---|---|---|---|---|---|---|---|---|---|---|
| | | Diff DTT | | | | | Diff DTT | | | | | Diff DTT | | | | |
| Package A | | -1.0 | 76.2% | -0.4 | 0.0 | | 0.0 | 70.9% | 0.0 | 0.0 | | 1.0 | 69.6% | 0.4 | 0.0 | 0.0 |
| Package B | | 0.0 | 15.9% | 0.0 | 0.0 | | -6.0 | 18.9% | -0.6 | -0.1 | | -7.0 | 18.5% | -0.6 | -0.1 | -0.1 |
| Package C | | 9.0 | 7.9% | 0.4 | 0.0 | | 11.0 | 10.2% | 0.6 | 0.1 | | 5.0 | 11.8% | 0.3 | 0.0 | 0.1 |

Package A  -1.4
Package B  -1.4
Package C   2.9

FIG. 13A Package Raw Data for Model A

Current Model Year/30 Days Sales

| | DEALER | | | | | | | | | | | |
|---|---|---|---|---|---|---|---|---|---|---|---|---|
| | DTT | Diff DTT | Sales | Sales % | DOL | Diff DOL | Stock | Stock % | Pipe | Total | Total % | Order Bank |
| | 55.0 | | 1 | 100% | 79 | | 32 | 100% | 27 | 59 | 100% | 2 |
| Package A | 55 | 0.0 | 1 | 100.0% | 79 | 0.4 | 24 | 75.0% | 24 | 48 | 81.4% | 2 |
| Package B | 0 | 55.0 | 0 | 0.0% | 84 | -4.6 | 6 | 18.8% | 2 | 8 | 13.6% | 0 |
| Package C | 0 | 55.0 | 0 | 0.0% | 71 | 8.4 | 2 | 6.3% | 1 | 3 | 5.1% | 0 |

Current Model Year/90 Days Sales

| | DEALER | | | | | | | | | | | |
|---|---|---|---|---|---|---|---|---|---|---|---|---|
| | DTT | Diff DTT | Sales | Sales % | DOL | Diff DOL | Stock | Stock % | Pipe | Total | Total % | Order Bank |
| | 55.0 | | 1 | 100% | 79 | | 32 | 100% | 27 | 59 | 100% | 2 |
| Package A | 55 | 0.0 | 1 | 100.0% | 79 | 0.4 | 24 | 75.0% | 24 | 48 | 81.4% | 2 |
| Package B | 0 | 55.0 | 0 | 0.0% | 84 | -4.6 | 6 | 18.8% | 2 | 8 | 13.6% | 0 |
| Package C | 0 | 55.0 | 0 | 0.0% | 71 | 8.4 | 2 | 6.3% | 1 | 3 | 5.1% | 0 |

Current Model Year/Full Model Year Sales

| | DEALER | | | | | | | | | | | |
|---|---|---|---|---|---|---|---|---|---|---|---|---|
| | DTT | Diff DTT | Sales | Sales % | DOL | Diff DOL | Stock | Stock % | Pipe | Total | Total % | Order Bank |
| | 55.0 | | 1 | 100% | 79 | | 32 | 100% | 27 | 59 | 100% | 2 |
| Package A | 55 | 0.0 | 1 | 100.0% | 79 | 0.4 | 24 | 75.0% | 24 | 48 | 81.4% | 2 |
| Package B | 0 | 55.0 | 0 | 0.0% | 84 | -4.6 | 6 | 18.8% | 2 | 8 | 13.6% | 0 |
| Package C | 0 | 55.0 | 0 | 0.0% | 71 | 8.4 | 2 | 6.3% | 1 | 3 | 5.1% | 0 |

Current Model Year/30 Days Sales

| | DISTRICT | | | | | | | | | |
|---|---|---|---|---|---|---|---|---|---|---|
| | DTT | Diff DTT | Sales | Sales % | DOL | Diff DOL | Stock | Stock % | Total | Total % |
| | 47.0 | | 5 | 100% | 59 | | 107 | 100% | 271 | 100% |
| Package A | 48 | -1.0 | 4 | 80.0% | 58 | 1.1 | 86 | 80.4% | 210 | 77.5% |
| Package B | 0 | 47.0 | 0 | 0.0% | 68 | -8.9 | 16 | 15.0% | 43 | 15.9% |
| Package C | 43 | 4.0 | 1 | 20.0% | 50 | 9.1 | 5 | 4.7% | 18 | 6.6% |

Current Model Year/90 Days Sales

| | DISTRICT | | | | | | | | | |
|---|---|---|---|---|---|---|---|---|---|---|
| | DTT | Diff DTT | Sales | Sales % | DOL | Diff DOL | Stock | Stock % | Total | Total % |
| | 30.0 | | 10 | 100% | 59.1 | | 107 | 100% | 271 | 100% |
| Package A | 31 | -1.0 | 8 | 80.0% | 58 | 1.1 | 86 | 80.4% | 210 | 77.5% |
| Package B | 30 | 0.0 | 1 | 10.0% | 68 | -8.9 | 16 | 15.0% | 43 | 15.9% |
| Package C | 22 | 8.0 | 1 | 10.0% | 50 | 9.1 | 5 | 4.7% | 18 | 6.6% |

Current Model Year/Full Model Year Sales

| | DISTRICT | | | | | | | | | |
|---|---|---|---|---|---|---|---|---|---|---|
| | DTT | Diff DTT | Sales | Sales % | DOL | Diff DOL | Stock | Stock % | Total | Total % |
| | 30.0 | | 10 | 100% | 59.1 | | 107 | 100% | 271 | 100% |
| Package A | 31 | -1.0 | 8 | 80.0% | 58 | 1.1 | 86 | 80.4% | 210 | 77.5% |
| Package B | 30 | 0.0 | 1 | 10.0% | 68 | -8.9 | 16 | 15.0% | 43 | 15.9% |
| Package C | 22 | 8.0 | 1 | 10.0% | 50 | 9.1 | 5 | 4.7% | 18 | 6.6% |

FIG. 13B

Current Model Year/30 Days Sales

| | REGION | | | | | | | | | |
|---|---|---|---|---|---|---|---|---|---|---|
| | DTT | Diff DTT | Sales | Sales % | DOL | Diff DOL | Stock | Stock % | Total | Inv % |
| | 38.3 | | 37 | 100% | 65.9 | | 468 | 100% | 1159 | 100% |
| Package A | 39 | -0.7 | 30 | 81.1% | 64 | 1.9 | 364 | 77.8% | 892 | 77.0% |
| Package B | 34 | 4.3 | 4 | 10.8% | 78 | -12.1 | 84 | 17.9% | 180 | 15.5% |
| Package C | 37 | 1.3 | 3 | 8.1% | 49 | 16.9 | 20 | 4.3% | 87 | 7.5% |

Current Model Year/90 Days Sales

| | REGION | | | | | | | | | |
|---|---|---|---|---|---|---|---|---|---|---|
| | DTT | Diff DTT | Sales | Sales % | DOL | Diff DOL | Stock | Stock % | Total | Inv % |
| | 28.0 | | 68 | 100% | 65.9 | | 468 | 100% | 1159 | 100% |
| Package A | 28 | 0.0 | 58 | 85.3% | 64 | 1.9 | 364 | 77.8% | 892 | 77.0% |
| Package B | 27 | 1.0 | 6 | 8.8% | 78 | -12.1 | 84 | 17.9% | 180 | 15.5% |
| Package C | 29 | -1.0 | 4 | 5.9% | 49 | 16.9 | 20 | 4.3% | 87 | 7.5% |

Current Model Year/Full Model Year Sales

| | REGION | | | | | | | | | |
|---|---|---|---|---|---|---|---|---|---|---|
| | DTT | Diff DTT | Sales | Sales % | DOL | Diff DOL | Stock | Stock % | Total | Inv % |
| | 28.0 | | 68 | 100% | 65.9 | | 468 | 100% | 1159 | 100% |
| Package A | 28 | 0.0 | 58 | 85.3% | 64 | 1.9 | 364 | 77.8% | 892 | 77.0% |
| Package B | 27 | 1.0 | 6 | 8.8% | 78 | -12.1 | 84 | 17.9% | 180 | 15.5% |
| Package C | 29 | -1.0 | 4 | 5.9% | 49 | 16.9 | 20 | 4.3% | 87 | 7.5% |

Past Model Year/30 Days Sales

| | DEALER | | | | | | | | | | |
|---|---|---|---|---|---|---|---|---|---|---|---|
| | DTT | Diff DTT | Sales | Sales % | DOL | Diff DOL | Stock | Stock % | Pipe | Total | Total % | Order Bank |
| | 108.9 | | 17 | 100% | 79 | | 32 | 100% | 27 | 59 | 100% | 2 |
| Package A | 111 | -2.1 | 14 | 82.4% | 79 | 0.4 | 24 | 75.0% | 24 | 48 | 81.4% | 2 |
| Package B | 99 | 9.9 | 3 | 17.6% | 84 | -4.6 | 6 | 18.8% | 2 | 8 | 13.6% | 0 |
| Package C | 0 | 108.9 | 0 | 0.0% | 71 | 8.4 | 2 | 6.3% | 1 | 3 | 5.1% | 0 |

Past Model Year/90 Days Sales

| | DEALER | | | | | | | | | | |
|---|---|---|---|---|---|---|---|---|---|---|---|
| | DTT | Diff DTT | Sales | Sales % | DOL | Diff DOL | Stock | Stock % | Pipe | Total | Total % | Order Bank |
| | 94.0 | | 36 | 100% | 79 | | 32 | 100% | 27 | 59 | 100% | 2 |
| Package A | 100 | -6.0 | 27 | 75.0% | 79 | 0.4 | 24 | 75.0% | 24 | 48 | 81.4% | 2 |
| Package B | 94 | 0.0 | 6 | 16.7% | 84 | -4.6 | 6 | 18.8% | 2 | 8 | 13.6% | 0 |
| Package C | 40 | 54.0 | 3 | 8.3% | 71 | 8.4 | 2 | 6.3% | 1 | 3 | 5.1% | 0 |

Past Model Year/Full Model Year Sales

| | DEALER | | | | | | | | | | |
|---|---|---|---|---|---|---|---|---|---|---|---|
| | DTT | Diff DTT | Sales | Sales % | DOL | Diff DOL | Stock | Stock % | Pipe | Total | Inv % | Order Bank |
| | 50.0 | | 151 | 100% | 79 | | 32 | 100% | 27 | 59 | 100% | 2 |
| Package A | 51 | -1.0 | 115 | 76.2% | 79 | 0.4 | 24 | 75.0% | 24 | 48 | 81.4% | 2 |
| Package B | 50 | 0.0 | 24 | 15.9% | 84 | -4.6 | 6 | 18.8% | 2 | 8 | 13.6% | 0 |
| Package C | 41 | 9.0 | 12 | 7.9% | 71 | 8.4 | 2 | 6.3% | 1 | 3 | 5.1% | 0 |

FIG. 13C

Past Model Year/30 Days Sales

| | DISTRICT ||||||||| |
|---|---|---|---|---|---|---|---|---|---|---|
| | DTT | Diff DTT | Sales | Sales % | DOL | Diff DOL | Stock | Stock % | Total | Total % |
| | 71.9 | | 33 | 100% | 59 | | 107 | 100% | 271 | 100% |
| Package A | 74 | -2.1 | 19 | 57.6% | 58 | 1.1 | 86 | 80.4% | 210 | 77.5% |
| Package B | 73 | -1.1 | 8 | 24.2% | 68 | -8.9 | 16 | 15.0% | 43 | 15.9% |
| Package C | 64 | 7.9 | 6 | 18.2% | 50 | 9.1 | 5 | 4.7% | 18 | 6.6% |

Past Model Year/90 Days Sales

| | DISTRICT ||||||||| |
|---|---|---|---|---|---|---|---|---|---|---|
| | DTT | Diff DTT | Sales | Sales % | DOL | Diff DOL | Stock | Stock % | Total | Total % |
| | 58.0 | | 115 | 100% | 59.1 | | 107 | 100% | 271 | 100% |
| Package A | 58 | 0.0 | 75 | 65.2% | 58 | 1.1 | 86 | 80.4% | 210 | 77.5% |
| Package B | 67 | -9.0 | 22 | 19.1% | 68 | -8.9 | 16 | 15.0% | 43 | 15.9% |
| Package C | 47 | 11.0 | 18 | 15.7% | 50 | 9.1 | 5 | 4.7% | 18 | 6.6% |

Past Model Year/Full Model Year Sales

| | DISTRICT ||||||||| |
|---|---|---|---|---|---|---|---|---|---|---|
| | DTT | Diff DTT | Sales | Sales % | DOL | Diff DOL | Stock | Stock % | Total | Total % |
| | 42.0 | | 704 | 100% | 59.1 | | 107 | 100% | 271 | 100% |
| Package A | 42 | 0.0 | 499 | 70.9% | 58 | 1.1 | 86 | 80.4% | 210 | 77.5% |
| Package B | 48 | -6.0 | 133 | 18.9% | 68 | -8.9 | 16 | 15.0% | 43 | 15.9% |
| Package C | 31 | 11.0 | 72 | 10.2% | 50 | 9.1 | 5 | 4.7% | 18 | 6.6% |

Past Model Year/30 Days Sales

| | REGION ||||||||| |
|---|---|---|---|---|---|---|---|---|---|---|
| | DTT | Diff DTT | Sales | Sales % | DOL | Diff DOL | Stock | Stock % | Total | Inv % |
| | 77.1 | | 105 | 100% | 65.9 | | 468 | 100% | 1159 | 100% |
| Package A | 77 | 0.1 | 75 | 71.4% | 64 | 1.9 | 364 | 77.8% | 892 | 77.0% |
| Package B | 87 | -9.9 | 18 | 17.1% | 78 | -12.1 | 84 | 17.9% | 180 | 15.5% |
| Package C | 63 | 14.1 | 12 | 11.4% | 49 | 16.9 | 20 | 4.3% | 87 | 7.5% |

Current Model Year/90 Days Sales

| | REGION ||||||||| |
|---|---|---|---|---|---|---|---|---|---|---|
| | DTT | Diff DTT | Sales | Sales % | DOL | Diff DOL | Stock | Stock % | Total | Inv % |
| | 72.0 | | 468 | 100% | 65.9 | | 468 | 100% | 1159 | 100% |
| Package A | 70 | 2.0 | 337 | 72.0% | 64 | 1.9 | 364 | 77.8% | 892 | 77.0% |
| Package B | 90 | -18.0 | 84 | 17.9% | 78 | -12.1 | 84 | 17.9% | 180 | 15.5% |
| Package C | 54 | 18.0 | 47 | 10.0% | 49 | 16.9 | 20 | 4.3% | 87 | 7.5% |

Past Model Year/Full Model Year Sales

| | REGION ||||||||| |
|---|---|---|---|---|---|---|---|---|---|---|
| | DTT | Diff DTT | Total | Sales % | DOL | Diff DOL | Stock | Stock % | Total | Inv % |
| | 52.0 | | 2549 | 100% | 65.9 | | 468 | 100% | 1159 | 100% |
| Package A | 51 | 1.0 | 1775 | 69.6% | 64 | 1.9 | 364 | 77.8% | 892 | 77.0% |
| Package B | 59 | -7.0 | 472 | 18.5% | 78 | -12.1 | 84 | 17.9% | 180 | 15.5% |
| Package C | 47 | 5.0 | 302 | 11.8% | 49 | 16.9 | 20 | 4.3% | 87 | 7.5% |

FIG. 14CA
5. Sales/Stock Gap
Metric Factor 100

Time Weighted Factor=(Sales%−Factored Inventory%)*Metric Factor*Dealer/District/Region Sizing Factor*Time Factor

Current Model Year/30 Days Sales

| | Dealer | Sizing Factor 1.75 | | Time Factor | 2.1% | District | Sizing Factor 1 | | Time Factor | 4.7% | Region | Sizing Factor 1 | | Time Factor | 8.3% | |
|---|---|---|---|---|---|---|---|---|---|---|---|---|---|---|---|---|
| | Sales % | Factored Inv Total % (see 4) | Gap | Total | Time Weighted Total | | Sales % | Inv Total % | Gap | Total | Time Weighted Total | | Sales % | Inv Total % | Gap | Total | Time Weighted Total | Sub Total |
| Color A | 0.0% | 31.0% | −31.0% | −54.3 | −1.1 | | 20.0% | 77.5% | −57.5% | −57.5 | −2.7 | | 29.7% | 25.5% | 4.3% | 4.3 | 0.4 | −3.5 |
| Color B | 0.0% | 44.1% | −44.1% | −77.2 | −1.6 | | 20.0% | 15.9% | 4.1% | 4.1 | 0.2 | | 35.1% | 44.2% | −9.0% | −9.0 | −0.7 | −2.2 |
| Color C | 100.0% | 24.8% | 75.2% | 131.5 | 2.8 | | 60.0% | 6.6% | 53.4% | 53.4 | 2.5 | | 35.1% | 30.4% | 4.8% | 4.8 | 0.4 | 5.6 |

Current Model Year/90 Days Sales

| | Dealer | Sizing Factor 1.75 | | Time Factor | 3.7% | District | Sizing Factor 1 | | Time Factor | 10.4% | Region | Sizing Factor 1 | | Time Factor | 15.8% | |
|---|---|---|---|---|---|---|---|---|---|---|---|---|---|---|---|---|
| | Sales % | Factored Inv Total % (see 4) | Gap | Total | Time Weighted Total | | Sales % | Inv Total % | Gap | Total | Time Weighted Total | | Sales % | Inv Total % | Gap | Total | Time Weighted Total | Sub Total |
| Color A | 0.0% | 31.0% | −31.0% | −54.3 | −2.0 | | 20.0% | 77.5% | −57.5% | −57.5 | −6.0 | | 23.5% | 25.5% | −1.9% | −1.9 | −0.3 | −8.3 |
| Color B | 0.0% | 44.1% | −44.1% | −77.2 | −2.8 | | 10.0% | 15.9% | −5.9% | −5.9 | −0.6 | | 38.2% | 44.2% | −5.9% | −5.9 | −0.9 | −4.4 |
| Color C | 100.0% | 24.8% | 75.2% | 131.5 | 4.8 | | 70.0% | 6.6% | 63.4% | 63.4 | 6.6 | | 38.2% | 30.4% | 7.9% | 7.9 | 1.2 | 12.7 |

Current Model Year/Full Model Year Sales

| | Dealer | Sizing Factor 1.75 | | Time Factor | 0.1% | District | Sizing Factor 1 | | Time Factor | 0.3% | Region | Sizing Factor 1 | | Time Factor | 0.5% | |
|---|---|---|---|---|---|---|---|---|---|---|---|---|---|---|---|---|
| | Sales % | Factored Inv Total % (see 4) | Gap | Total | Time Weighted Total | | Sales % | Inv Total % | Gap | Total | Time Weighted Total | | Sales % | Inv Total % | Gap | Total | Time Weighted Total | Sub Total |
| Color A | 0.0% | 31.0% | −31.0% | −54.3 | −0.1 | | 20.0% | 77.5% | −57.5% | −57.5 | −0.2 | | 23.5% | 25.5% | −1.9% | −1.9 | 0.0 | −0.2 |
| Color B | 0.0% | 44.1% | −44.1% | −77.2 | −0.1 | | 10.0% | 15.9% | −5.9% | −5.9 | 0.0 | | 38.2% | 44.2% | −5.9% | −5.9 | 0.0 | −0.1 |
| Color C | 100.0% | 24.8% | 75.2% | 131.5 | 0.2 | | 70.0% | 6.6% | 63.4% | 63.4 | 0.2 | | 38.2% | 30.4% | 7.9% | 7.9 | 0.0 | 0.4 |

FIG. 14CB

Past Model Year/30 Days Sales

| | Dealer | | | | | | District | | | | | | Region | | | | | |
|---|---|---|---|---|---|---|---|---|---|---|---|---|---|---|---|---|---|---|
| | Sales % | Sizing Factor Factored Inv Total % (see 4) | 1.75 Gap | Time Factor Total | 17.9% Time Weighted Total | | Sales % | Sizing Factor Inv Total % | 1 Gap | Time Factor Total | 15.3% Time Weighted Total | | Sales % | Sizing Factor Inv Total % | 1 Gap | Time Factor Total | 11.7% Time Weighted Total | Sub Total |
| Color A | 41.2% | 31.0% | 10.1% | 17.7 | 3.2 | | 36.4% | 77.5% | -41.1% | -41.1 | -6.3 | | 29.5% | 25.5% | 4.1% | 4.1 | 0.5 | -2.7 |
| Color B | 47.1% | 44.1% | 2.9% | 5.1 | 0.9 | | 48.5% | 15.9% | 32.6% | 32.6 | 5.0 | | 50.5% | 44.2% | 6.3% | 6.3 | 0.7 | 6.7 |
| Color C | 11.8% | 24.8% | -13.1% | -22.9 | -4.1 | | 15.2% | 6.6% | 8.5% | 8.5 | 1.3 | | 20.0% | 30.4% | -10.4% | -10.4 | -1.2 | -4.0 |

Past Model Year/90 Days Sales

| | Dealer | | | | | | District | | | | | | Region | | | | | |
|---|---|---|---|---|---|---|---|---|---|---|---|---|---|---|---|---|---|---|
| | Sales % | Sizing Factor Factored Inv Total % (see 4) | 1.75 Gap | Time Factor Total | 66.3% Time Weighted Total | | Sales % | Sizing Factor Inv Total % | 1 Gap | Time Factor Total | 59.6% Time Weighted Total | | Sales % | Sizing Factor Inv Total % | 1 Gap | Time Factor Total | 54.2% Time Weighted Total | Sub Total |
| Color A | 44.4% | 31.0% | 13.4% | 23.5 | 15.6 | | 34.8% | 77.5% | -42.7% | -42.7 | -25.5 | | 28.0% | 25.5% | 2.5% | 2.5 | 1.4 | -8.5 |
| Color B | 36.1% | 44.1% | -8.0% | -14.0 | -9.3 | | 37.4% | 15.9% | 21.5% | 21.5 | 12.8 | | 43.6% | 44.2% | -0.6% | -0.6 | -0.3 | 3.2 |
| Color C | 19.4% | 24.8% | -5.4% | -9.4 | -6.3 | | 27.8% | 6.6% | 21.2% | 21.2 | 12.6 | | 28.4% | 30.4% | -2.0% | -2.0 | -1.1 | 5.3 |

Past Model Year/Full Model Year Sales

| | Dealer | | | | | | District | | | | | | Region | | | | | |
|---|---|---|---|---|---|---|---|---|---|---|---|---|---|---|---|---|---|---|
| | Sales % | Sizing Factor Factored Inv Total % (see 4) | 1.75 Gap | Time Factor Total | 9.9% Time Weighted Total | | Sales % | Sizing Factor Inv Total % | 1 Gap | Time Factor Total | 9.7% Time Weighted Total | | Sales % | Sizing Factor Inv Total % | 1 Gap | Time Factor Total | 9.5% Time Weighted Total | Sub Total |
| Color A | 38.4% | 31.0% | 7.4% | 12.9 | 1.3 | | 29.4% | 77.5% | -48.1% | -48.1 | -4.7 | | 26.2% | 25.5% | 0.8% | 0.8 | 0.1 | -3.3 |
| Color B | 32.5% | 44.1% | -11.7% | -20.4 | -2.0 | | 41.3% | 15.9% | 25.5% | 25.5 | 2.5 | | 43.3% | 44.2% | -0.9% | -0.9 | -0.1 | 0.4 |
| Color C | 29.1% | 24.8% | 4.3% | 7.5 | 0.7 | | 29.3% | 6.6% | 22.6% | 22.6 | 2.2 | | 30.5% | 30.4% | 0.1% | 0.1 | 0.0 | 3.0 |

| | |
|---|---|
| Color A | -26.5 |
| Color B | 3.5 |
| Color C | 22.9 |

FIG. 14DA

6. Dealer Inv % vs. Area Sales %
Metric Factor  100

Time Weighted Factor=(Sales%-Factored Dealer Inventory%)*Metric Factor*District/Region Sizing Factor*Time Factor

Current Model Year/30 Days Sales

| Dealer | Sales % | Sizing Factor / Dealer Factored Inv Total | Gap | Time Factor 0 | Total | Time Weighted Total 2.1% | District | Sales % | Sizing Factor / Dealer Factored d Inv | Gap | Time Factor 0.5 | Total | Time Weighted Total 4.7% | Region | Sales % | Sizing Factor / Dealer Factore d Inv | Gap | Time Factor 0.5 | Total | Time Weighted Total 8.3% | Sub Total |
|---|---|---|---|---|---|---|---|---|---|---|---|---|---|---|---|---|---|---|---|---|---|
| Color A |  |  |  |  |  |  |  | 20.0% | 31.0% | -11.0% |  | -5.5 | -0.3 |  | 29.7% | 31.0% | -1.3% |  | -0.7 | -0.1 | -0.3 |
| Color B |  |  |  |  |  |  |  | 20.0% | 44.1% | -24.1% |  | -12.1 | -0.6 |  | 35.1% | 44.1% | -9.0% |  | -4.5 | -0.4 | -0.9 |
| Color C |  |  |  |  |  |  |  | 60.0% | 24.8% | 35.2% |  | 17.6 | 0.8 |  | 35.1% | 24.8% | 10.3% |  | 5.1 | 0.4 | 1.2 |

Current Model Year/90 Days Sales

| Dealer | Sales % | Sizing Factor / Dealer Factored Inv Total | Gap | Time Factor 0 | Total | Time Weighted Total 3.7% | District | Sales % | Sizing Factor / Dealer Factored d Inv | Gap | Time Factor 0.5 | Total | Time Weighted Total 10.4% | Region | Sales % | Sizing Factor / Dealer Factore d Inv | Gap | Time Factor 0.5 | Total | Time Weighted Total 15.8% | Sub Total |
|---|---|---|---|---|---|---|---|---|---|---|---|---|---|---|---|---|---|---|---|---|---|
| Color A |  |  |  |  |  |  |  | 20.0% | 31.0% | -11.0% |  | -5.5 | -0.6 |  | 23.5% | 31.0% | -7.5% |  | -3.8 | -0.6 | -1.2 |
| Color B |  |  |  |  |  |  |  | 10.0% | 44.1% | -34.1% |  | -17.1 | -1.8 |  | 38.2% | 44.1% | -5.9% |  | -2.9 | -0.5 | -2.2 |
| Color C |  |  |  |  |  |  |  | 70.0% | 24.8% | 45.2% |  | 22.6 | 2.3 |  | 38.2% | 24.8% | 13.4% |  | 6.7 | 1.1 | 3.4 |

Current Model Year/Full Model Year Sales

| Dealer | Sales % | Sizing Factor / Dealer Factored Inv Total | Gap | Time Factor 0 | Total | Time Weighted Total 0.1% | District | Sales % | Sizing Factor / Dealer Factored d Inv | Gap | Time Factor 0.5 | Total | Time Weighted Total 0.3% | Region | Sales % | Sizing Factor / Dealer Factore d Inv | Gap | Time Factor 0.5 | Total | Time Weighted Total 0.5% | Sub Total |
|---|---|---|---|---|---|---|---|---|---|---|---|---|---|---|---|---|---|---|---|---|---|
| Color A |  |  |  |  |  |  |  | 20.0% | 31.0% | -11.0% |  | -5.5 | 0.0 |  | 23.5% | 31.0% | -7.5% |  | -3.8 | 0.0 | 0.0 |
| Color B |  |  |  |  |  |  |  | 10.0% | 44.1% | -34.1% |  | -17.1 | 0.0 |  | 38.2% | 44.1% | -5.9% |  | -2.9 | 0.0 | -0.1 |
| Color C |  |  |  |  |  |  |  | 70.0% | 24.8% | 45.2% |  | 22.6 | 0.1 |  | 38.2% | 24.8% | 13.4% |  | 6.7 | 0.0 | 0.1 |

FIG. 14DB

Past Model Year/30 Days Sales

| Dealer | | | | | District | | | | | Region | | | | | |
|---|---|---|---|---|---|---|---|---|---|---|---|---|---|---|---|
| | Sales % | Sizing Factor / Dealer Factored Inv Total | Gap | Time Factor 0 / Total | Time Weighted Total 17.9% | | Sales % | Sizing Factor / Dealer Factored d Inv | Gap 0.5 | Time Factor / Total | Time Weighted Total 15.3% | | Sales % | Sizing Factor / Dealer Factored d Inv | Gap 0.5 | Time Factor / Total | Time Weighted Total 11.7% | Sub Total |
| Color A | | | | | | | 36.4% | 31.0% | 5.3% | 2.7 | 0.4 | | 29.5% | 31.0% | -1.5% | -0.8 | -0.1 | 0.3 |
| Color B | | | | | | | 48.5% | 44.1% | 4.4% | 2.2 | 0.3 | | 50.5% | 44.1% | 6.4% | 3.2 | 0.4 | 0.7 |
| Color C | | | | | | | 15.2% | 24.8% | -9.7% | -4.8 | -0.7 | | 20.0% | 24.8% | -4.8% | -2.4 | -0.3 | -1.0 |

Past Model Year/90 Days Sales

| Dealer | | | | | District | | | | | Region | | | | | |
|---|---|---|---|---|---|---|---|---|---|---|---|---|---|---|---|
| | Sales % | Sizing Factor / Dealer Factored Inv Total | Gap | Time Factor 0 / Total | Time Weighted Total 66.3% | | Sales % | Sizing Factor / Dealer Factored d Inv | Gap 0.5 | Time Factor / Total | Time Weighted Total 59.6% | | Sales % | Sizing Factor / Dealer Factored d Inv | Gap 0.5 | Time Factor / Total | Time Weighted Total 54.2% | Sub Total |
| Color A | | | | | | | 34.8% | 31.0% | 3.7% | 1.9 | 1.1 | | 28.0% | 31.0% | -3.0% | -1.5 | -0.8 | 0.3 |
| Color B | | | | | | | 37.4% | 44.1% | -6.7% | -3.4 | -2.0 | | 43.6% | 44.1% | -0.5% | -0.3 | -0.1 | -2.2 |
| Color C | | | | | | | 27.8% | 24.8% | 3.0% | 1.5 | 0.9 | | 28.4% | 24.8% | 3.6% | 1.8 | 1.0 | 1.9 |

Past Model Year/Full Model Year Sales

| Dealer | | | | | District | | | | | Region | | | | | |
|---|---|---|---|---|---|---|---|---|---|---|---|---|---|---|---|
| | Sales % | Sizing Factor / Dealer Factored Inv Total | Gap | Time Factor 0 / Total | Time Weighted Total 9.9% | | Sales % | Sizing Factor / Dealer Factored d Inv | Gap 0.5 | Time Factor / Total | Time Weighted Total 9.7% | | Sales % | Sizing Factor / Dealer Factored d Inv | Gap 0.5 | Time Factor / Total | Time Weighted Total 9.5% | Sub Total |
| Color A | | | | | | | 29.4% | 31.0% | -1.6% | -0.8 | -0.1 | | 26.2% | 31.0% | -4.8% | -2.4 | -0.2 | -0.3 |
| Color B | | | | | | | 41.3% | 44.1% | -2.8% | -1.4 | -0.1 | | 43.3% | 44.1% | -0.8% | -0.4 | 0.0 | -0.2 |
| Color C | | | | | | | 29.3% | 24.8% | 4.4% | 2.2 | 0.2 | | 30.5% | 24.8% | 5.6% | 2.8 | 0.3 | 0.5 |

Color A    -1.2
Color B    -4.8
Color C    6.1

FIG. 14EA

7. Sales Total % (optional)
Metric Factor   10

Time Weighted Total=Sales%*Metric Factor*Dealer/District/Region Sizing Factor* Time Factor

Current Model Year/30 Days Sales

| Dealer | Sizing Factor | Sales% | Time Factor | Total | Time Weighted Total | District | Sizing Factor | Sales% | Time Factor | Total | Time Weighted Total | Region | Sizing Factor | Sales% | Time Factor | Total | Time Weighted Total | Sub Total |
|---|---|---|---|---|---|---|---|---|---|---|---|---|---|---|---|---|---|---|
|  | 0.4 |  |  |  | 2.1% |  | 0.8 |  |  |  | 4.7% |  | 0.8 |  |  |  | 8.3% |  |
| Color A |  | 0.0% | 0.0 | 0.0 | 0.0 |  |  | 20.0% | 1.6 | 1.6 | 0.1 |  |  | 29.7% | 2.4 | 0.2 | 0.2 | 0.3 |
| Color B |  | 0.0% | 0.0 | 0.0 | 0.0 |  |  | 20.0% | 1.6 | 1.6 | 0.1 |  |  | 35.1% | 2.8 | 0.2 | 0.2 | 0.3 |
| Color C |  | 100.0% | 4.0 | 4.0 | 0.1 |  |  | 60.0% | 4.8 | 4.8 | 0.2 |  |  | 35.1% | 2.8 | 0.2 | 0.2 | 0.5 |

Current Model Year/90 Days Sales

| Dealer | Sizing Factor | Sales% | Time Factor | Total | Time Weighted Total | District | Sizing Factor | Sales% | Time Factor | Total | Time Weighted Total | Region | Sizing Factor | Sales% | Time Factor | Total | Time Weighted Total | Sub Total |
|---|---|---|---|---|---|---|---|---|---|---|---|---|---|---|---|---|---|---|
|  | 0.4 |  |  |  | 3.7% |  | 0.8 |  |  |  | 10.4% |  | 0.8 |  |  |  | 15.8% |  |
| Color A |  | 0.0% | 0.0 | 0.0 | 0.0 |  |  | 20.0% | 1.6 | 1.6 | 0.2 |  |  | 23.5% | 1.9 | 0.3 | 0.3 | 0.5 |
| Color B |  | 0.0% | 0.0 | 0.0 | 0.0 |  |  | 10.0% | 0.8 | 0.8 | 0.1 |  |  | 38.2% | 3.1 | 0.5 | 0.5 | 0.6 |
| Color C |  | 100.0% | 4.0 | 4.0 | 0.1 |  |  | 70.0% | 5.6 | 5.6 | 0.6 |  |  | 38.2% | 3.1 | 0.5 | 0.5 | 1.2 |

Current Model Year/Full Model Year Sales

| Dealer | Sizing Factor | Sales% | Time Factor | Total | Time Weighted Total | District | Sizing Factor | Sales% | Time Factor | Total | Time Weighted Total | Region | Sizing Factor | Sales% | Time Factor | Total | Time Weighted Total | Sub Total |
|---|---|---|---|---|---|---|---|---|---|---|---|---|---|---|---|---|---|---|
|  | 0.4 |  |  |  | 0.1% |  | 0.8 |  |  |  | 0.3% |  | 0.8 |  |  |  | 0.5% |  |
| Color A |  | 0.0% | 0.0 | 0.0 | 0.0 |  |  | 20.0% | 1.6 | 1.6 | 0.0 |  |  | 23.5% | 1.9 | 0.0 | 0.0 | 0.0 |
| Color B |  | 0.0% | 0.0 | 0.0 | 0.0 |  |  | 10.0% | 0.8 | 0.8 | 0.0 |  |  | 38.2% | 3.1 | 0.0 | 0.0 | 0.0 |
| Color C |  | 100.0% | 4.0 | 4.0 | 0.0 |  |  | 70.0% | 5.6 | 5.6 | 0.0 |  |  | 38.2% | 3.1 | 0.0 | 0.0 | 0.0 |

FIG. 14EB

Past Model Year/30 Days Sales

| Dealer | Sizing Factor | Time Factor | Time Weighted Total | District | Sizing Factor | Time Factor | Time Weighted Total | Region | Sizing Factor | Time Factor | Time Weighted Total | Sub Total |
|---|---|---|---|---|---|---|---|---|---|---|---|---|
| | 0.4 | | 17.9% | | 0.8 | | 15.3% | | 0.8 | | 11.7% | |
| | Sales% | Total | | | Sales% | Total | | | Sales% | Total | | |
| Color A | 41.2% | 1.6 | 0.3 | | 36.4% | 2.9 | 0.4 | | 29.5% | 2.4 | 0.3 | 1.0 |
| Color B | 47.1% | 1.9 | 0.3 | | 48.5% | 3.9 | 0.6 | | 50.5% | 4.0 | 0.5 | 1.4 |
| Color C | 11.8% | 0.5 | 0.1 | | 15.2% | 1.2 | 0.2 | | 20.0% | 1.6 | 0.2 | 0.5 |

Past Model Year/90 Days Sales

| Dealer | Sizing Factor | Time Factor | Time Weighted Total | District | Sizing Factor | Time Factor | Time Weighted Total | Region | Sizing Factor | Time Factor | Time Weighted Total | Sub Total |
|---|---|---|---|---|---|---|---|---|---|---|---|---|
| | 0.4 | | 66.3% | | 0.8 | | 59.6% | | 0.8 | | 54.2% | |
| | Sales% | Total | | | Sales% | Total | | | Sales% | Total | | |
| Color A | 44.4% | 1.8 | 1.2 | | 34.8% | 2.8 | 1.7 | | 28.0% | 2.8 | 1.5 | 4.4 |
| Color B | 36.1% | 1.4 | 1.0 | | 37.4% | 3.0 | 1.8 | | 43.6% | 4.4 | 2.4 | 5.1 |
| Color C | 19.4% | 0.8 | 0.5 | | 27.8% | 2.2 | 1.3 | | 28.4% | 2.8 | 1.5 | 3.4 |

Past Model Year/Full Model Year Sales

| Dealer | Sizing Factor | Time Factor | Time Weighted Total | District | Sizing Factor | Time Factor | Time Weighted Total | Region | Sizing Factor | Time Factor | Time Weighted Total | Sub Total |
|---|---|---|---|---|---|---|---|---|---|---|---|---|
| | 0.4 | | 9.9% | | 0.8 | | 9.7% | | 0.8 | | 9.5% | |
| | Sales% | Total | | | Sales% | Total | | | Sales% | Total | | |
| Color A | 38.4% | 1.5 | 0.2 | | 29.4% | 2.4 | 0.2 | | 26.2% | 2.1 | 0.2 | 0.6 |
| Color B | 32.5% | 1.3 | 0.1 | | 41.3% | 3.3 | 0.3 | | 43.3% | 3.5 | 0.3 | 0.8 |
| Color C | 29.1% | 1.2 | 0.1 | | 29.3% | 2.3 | 0.2 | | 30.5% | 2.4 | 0.2 | 0.6 |

Color A 6.7
Color B 8.2
Color C 6.2

FIG. 14FFA

8. Days To Turn
Metric Factor    1

Time Weighted Total=Diff DTT*Sales%*Metric Factor*Dealer/District/Region Sizing Factor*Time Factor

Current Model Year/30 Days Sales

| Dealer | Sizing Factor | 0.5 | Time Factor | 2.1% | District | Sizing Factor | 0.25 | Time Factor | 4.7% | Region | Sizing Factor | 0.25 | Time Factor | 8.3% |
|---|---|---|---|---|---|---|---|---|---|---|---|---|---|---|
| | Diff DTT | Sales% | Total | Time Weighted Total | | Diff DTT | Sales% | Total | Time Weighted Total | | Diff DTT | Sales% | Total | Time Weighted Total | Sub Total |
| Color A | 55.0 | 0.0% | 0.0 | 0.0 | | 11.4 | 20.0% | 0.6 | 0.0 | | 3.2 | 29.7% | 0.2 | 0.0 | 0.0 |
| Color B | 55.0 | 0.0% | 0.0 | 0.0 | | 2.4 | 20.0% | 0.1 | 0.0 | | 0.2 | 35.1% | 0.0 | 0.0 | 0.0 |
| Color C | 0.0 | 100.0% | 0.0 | 0.0 | | -4.6 | 60.0% | -0.7 | 0.0 | | -2.8 | 35.1% | -0.2 | 0.0 | -0.1 |

Current Model Year/90 Days Sales

| Dealer | Sizing Factor | 0.5 | Time Factor | 3.7% | District | Sizing Factor | 0.25 | Time Factor | 10.4% | Region | Sizing Factor | 0.25 | Time Factor | 15.8% |
|---|---|---|---|---|---|---|---|---|---|---|---|---|---|---|
| | Diff DTT | Sales% | Total | Time Weighted Total | | Diff DTT | Sales% | Total | Time Weighted Total | | Diff DTT | Sales% | Total | Time Weighted Total | Sub Total |
| Color A | 55.0 | 0.0% | 0.0 | 0.0 | | 4.8 | 20.0% | 0.2 | 0.0 | | -1.9 | 23.5% | -0.1 | 0.0 | 0.0 |
| Color B | 55.0 | 0.0% | 0.0 | 0.0 | | -15.2 | 10.0% | -0.4 | 0.0 | | 1.1 | 38.2% | 0.1 | 0.0 | 0.0 |
| Color C | 0.0 | 100.0% | 0.0 | 0.0 | | 0.8 | 70.0% | 0.1 | 0.0 | | 0.1 | 38.2% | 0.0 | 0.0 | 0.0 |

Current Model Year/Full Model Year Sales

| Dealer | Sizing Factor | 0.5 | Time Factor | 0.1% | District | Sizing Factor | 0.25 | Time Factor | 0.3% | Region | Sizing Factor | 0.25 | Time Factor | 0.5% |
|---|---|---|---|---|---|---|---|---|---|---|---|---|---|---|
| | Diff DTT | Sales% | Total | Time Weighted Total | | Diff DTT | Sales% | Total | Time Weighted Total | | Diff DTT | Sales% | Total | Time Weighted Total | Sub Total |
| Color A | 55.0 | 0.0% | 0.0 | 0.0 | | 4.8 | 20.0% | 0.2 | 0.0 | | -1.9 | 23.5% | -0.1 | 0.0 | 0.0 |
| Color B | 55.0 | 0.0% | 0.0 | 0.0 | | -15.2 | 10.0% | -0.4 | 0.0 | | 1.1 | 38.2% | 0.1 | 0.0 | 0.0 |
| Color C | 0.0 | 100.0% | 0.0 | 0.0 | | 0.8 | 70.0% | 0.1 | 0.0 | | 0.1 | 38.2% | 0.0 | 0.0 | 0.0 |

FIG. 14FB

Past Model Year/30 Days Sales

| | Dealer | | | | | | District | | | | | | Region | | | | | | |
|---|---|---|---|---|---|---|---|---|---|---|---|---|---|---|---|---|---|---|---|
| | | Sizing Factor | | Time Factor | | 17.9% | | Sizing Factor | | Time Factor | | 15.3% | | Sizing Factor | | Time Factor | | 11.7% | |
| | | Diff DTT | 0.5 Sales% | Total | Time Weighted Total | | | Diff DTT | 0.25 Sales% | Total | Time Weighted Total | | | Diff DTT | 0.25 Sales% | Total | Time Weighted Total | | Sub Total |
| Color A | | 2.8 | 41.2% | 0.6 | 0.1 | | | -0.6 | 36.4% | -0.1 | 0.0 | | | 10.0 | 29.5% | 0.7 | 0.1 | | 0.2 |
| Color B | | -3.2 | 47.1% | -0.7 | -0.1 | | | -0.6 | 48.5% | -0.1 | 0.0 | | | -5.0 | 50.5% | -0.6 | -0.1 | | -0.2 |
| Color C | | 2.8 | 11.8% | 0.2 | 0.0 | | | 3.4 | 15.2% | 0.1 | 0.0 | | | -2.0 | 20.0% | -0.1 | 0.0 | | 0.0 |

Past Model Year/90 Days Sales

| | Dealer | | | | | | District | | | | | | Region | | | | | | |
|---|---|---|---|---|---|---|---|---|---|---|---|---|---|---|---|---|---|---|---|
| | | Sizing Factor | | Time Factor | | 66.3% | | Sizing Factor | | Time Factor | | 59.6% | | Sizing Factor | | Time Factor | | 54.2% | |
| | | Diff DTT | 0.5 Sales% | Total | Time Weighted Total | | | Diff DTT | 0.25 Sales% | Total | Time Weighted Total | | | Diff DTT | 0.25 Sales% | Total | Time Weighted Total | | Sub Total |
| Color A | | 14.1 | 44.4% | 3.1 | 2.1 | | | -3.0 | 34.8% | -0.3 | -0.2 | | | 12.1 | 28.0% | 0.9 | 0.5 | | 2.4 |
| Color B | | -16.9 | 36.1% | -3.0 | -2.0 | | | -1.0 | 37.4% | -0.1 | -0.1 | | | -9.9 | 43.6% | -1.1 | -0.6 | | -2.7 |
| Color C | | -0.9 | 19.4% | -0.1 | -0.1 | | | 5.0 | 27.8% | 0.3 | 0.2 | | | 3.1 | 28.4% | 0.2 | 0.1 | | 0.3 |

Past Model Year/Full Model Year Sales

| | Dealer | | | | | | District | | | | | | Region | | | | | | |
|---|---|---|---|---|---|---|---|---|---|---|---|---|---|---|---|---|---|---|---|
| | | Sizing Factor | | Time Factor | | 9.9% | | Sizing Factor | | Time Factor | | 9.7% | | Sizing Factor | | Time Factor | | 9.5% | |
| | | Diff DTT | 0.5 Sales% | Total | Time Weighted Total | | | Diff DTT | 0.25 Sales% | Total | Time Weighted Total | | | Diff DTT | 0.25 Sales% | Total | Time Weighted Total | | Sub Total |
| Color A | | 8.2 | 38.4% | 1.6 | 0.2 | | | 0.9 | 29.4% | 0.1 | 0.0 | | | 2.1 | 26.2% | 0.1 | 0.0 | | 0.2 |
| Color B | | -19.8 | 32.5% | -3.2 | -0.3 | | | -9.1 | 41.3% | -0.9 | -0.1 | | | -9.9 | 43.3% | -1.1 | -0.1 | | -0.5 |
| Color C | | 11.2 | 29.1% | 1.6 | 0.2 | | | 11.9 | 29.3% | 0.9 | 0.1 | | | 12.1 | 30.5% | 0.9 | 0.1 | | 0.3 |

| Color A | 2.8 |
| Color B | -3.4 |
| Color C | 0.6 |

FIG. 15A Color Raw Data for Model A

Current Model Year/30 Days Sales

| | DEALER | | | | | | | | | | | |
|---|---|---|---|---|---|---|---|---|---|---|---|---|
| | DTT | Diff DTT | Sales | Sales % | DOL | Diff DOL | Stock | Stock % | Pipe | Total | Total % | Order Bank |
| | 55.0 | | 1 | 100% | 79 | | 32 | 100% | 27 | 59 | 100% | 2 |
| Color A | 0 | 55.0 | 0 | 0.0% | 112 | -33.0 | 10 | 31.3% | 7 | 17 | 28.8% | 1 |
| Color B | 0 | 55.0 | 0 | 0.0% | 67 | 12.0 | 17 | 53.1% | 9 | 26 | 44.1% | 1 |
| Color C | 55 | 0.0 | 1 | 100.0% | 54 | 25.0 | 5 | 15.6% | 11 | 16 | 27.1% | 0 |

Current Model Year/90 Days Sales

| | DEALER | | | | | | | | | | | |
|---|---|---|---|---|---|---|---|---|---|---|---|---|
| | DTT | Diff DTT | Sales | Sales % | DOL | Diff DOL | Stock | Stock % | Pipe | Total | Total % | Order Bank |
| | 55.0 | | 1 | 100% | 79 | | 32 | 100% | 27 | 59 | 100% | 2 |
| Color A | 0 | 55.0 | 0 | 0.0% | 112 | -33.0 | 10 | 31.3% | 7 | 17 | 28.8% | 1 |
| Color B | 0 | 55.0 | 0 | 0.0% | 67 | 12.0 | 17 | 53.1% | 9 | 26 | 44.1% | 1 |
| Color C | 55 | 0.0 | 1 | 100.0% | 54 | 25.0 | 5 | 15.6% | 11 | 16 | 27.1% | 0 |

Current Model Year/Full Model Year Sales

| | DEALER | | | | | | | | | | | |
|---|---|---|---|---|---|---|---|---|---|---|---|---|
| | DTT | Diff DTT | Sales | Sales % | DOL | Diff DOL | Stock | Stock % | Pipe | Total | Total % | Order Bank |
| | 55.0 | | 1 | 100% | 79 | | 32 | 100% | 27 | 59 | 100% | 2 |
| Color A | 0 | 55.0 | 0 | 0.0% | 112 | -33.0 | 10 | 31.3% | 7 | 17 | 28.8% | 1 |
| Color B | 0 | 55.0 | 0 | 0.0% | 67 | 12.0 | 17 | 53.1% | 9 | 26 | 44.1% | 1 |
| Color C | 55 | 0.0 | 1 | 100.0% | 54 | 25.0 | 5 | 15.6% | 11 | 16 | 27.1% | 0 |

Current Model Year/30 Days Sales

| | DISTRICT | | | | | | | | | |
|---|---|---|---|---|---|---|---|---|---|---|
| | DTT | Diff DTT | Sales | Sales % | DOL | Diff DOL | Stock | Stock % | Total | Total % |
| | 47.4 | | 5 | 100% | 59 | | 107 | 100% | 271 | 100% |
| Color A | 36 | 11.4 | 1 | 20.0% | 71 | -11.7 | 36 | 33.6% | 210 | 77.5% |
| Color B | 45 | 2.4 | 1 | 20.0% | 53 | 6.3 | 45 | 42.1% | 43 | 15.9% |
| Color C | 52 | -4.6 | 3 | 60.0% | 54 | 5.3 | 26 | 24.3% | 18 | 6.6% |

Current Model Year/90 Days Sales

| | DISTRICT | | | | | | | | | |
|---|---|---|---|---|---|---|---|---|---|---|
| | DTT | Diff DTT | Sales | Sales % | DOL | Diff DOL | Stock | Stock % | Total | Total % |
| | 29.8 | | 10 | 100% | 59.3 | | 107 | 100% | 271 | 100% |
| Color A | 25 | 4.8 | 2 | 20.0% | 71 | -11.7 | 36 | 33.6% | 210 | 77.5% |
| Color B | 45 | -15.2 | 1 | 10.0% | 53 | 6.3 | 45 | 42.1% | 43 | 15.9% |
| Color C | 29 | 0.8 | 7 | 70.0% | 54 | 5.3 | 26 | 24.3% | 18 | 6.6% |

Current Model Year/Full Model Year Sales

| | DISTRICT | | | | | | | | | |
|---|---|---|---|---|---|---|---|---|---|---|
| | DTT | Diff DTT | Sales | Sales % | DOL | Diff DOL | Stock | Stock % | Total | Total % |
| | 29.8 | | 10 | 100% | 59.3 | | 107 | 100% | 271 | 100% |
| Color A | 25 | 4.8 | 2 | 20.0% | 71 | -11.7 | 36 | 33.6% | 210 | 77.5% |
| Color B | 45 | -15.2 | 1 | 10.0% | 53 | 6.3 | 45 | 42.1% | 43 | 15.9% |
| Color C | 29 | 0.8 | 7 | 70.0% | 54 | 5.3 | 26 | 24.3% | 18 | 6.6% |

FIG. 15B

Current Model Year/30 Days Sales

| | REGION | | | | | | | | | |
|---|---|---|---|---|---|---|---|---|---|---|
| | DTT | Diff DTT | Sales | Sales % | DOL | Diff DOL | Stock | Stock % | Total | Inv % |
| | 38.2 | | 37 | 100% | 65.0 | | 468 | 100% | 1159 | 100% |
| Color A | 35 | 3.2 | 11 | 29.7% | 61 | 4.0 | 117 | 25.0% | 295 | 25.5% |
| Color B | 38 | 0.2 | 13 | 35.1% | 70 | -5.0 | 224 | 47.9% | 512 | 44.2% |
| Color C | 41 | -2.8 | 13 | 35.1% | 60 | 5.0 | 127 | 27.1% | 352 | 30.4% |

Current Model Year/90 Days Sales

| | REGION | | | | | | | | | |
|---|---|---|---|---|---|---|---|---|---|---|
| | DTT | Diff DTT | Sales | Sales % | DOL | Diff DOL | Stock | Stock % | Total | Inv % |
| | 28.1 | | 68 | 100% | 65.0 | | 468 | 100% | 1159 | 100% |
| Color A | 30 | -1.9 | 16 | 23.5% | 61 | 4.0 | 117 | 25.0% | 295 | 25.5% |
| Color B | 27 | 1.1 | 26 | 38.2% | 70 | -5.0 | 224 | 47.9% | 512 | 44.2% |
| Color C | 28 | 0.1 | 26 | 38.2% | 60 | 5.0 | 127 | 27.1% | 352 | 30.4% |

Current Model Year/Full Model Year Sales

| | REGION | | | | | | | | | |
|---|---|---|---|---|---|---|---|---|---|---|
| | DTT | Diff DTT | Sales | Sales % | DOL | Diff DOL | Stock | Stock % | Total | Inv % |
| | 28.1 | | 68 | 100% | 65.0 | | 468 | 100% | 1159 | 100% |
| Color A | 30 | -1.9 | 16 | 23.5% | 61 | 4.0 | 117 | 25.0% | 295 | 25.5% |
| Color B | 27 | 1.1 | 26 | 38.2% | 70 | -5.0 | 224 | 47.9% | 512 | 44.2% |
| Color C | 28 | 0.1 | 26 | 38.2% | 60 | 5.0 | 127 | 27.1% | 352 | 30.4% |

Past Model Year/30 Days Sales

| | DEALER | | | | | | | | | | | |
|---|---|---|---|---|---|---|---|---|---|---|---|---|
| | DTT | Diff DTT | Sales | Sales % | DOL | Diff DOL | Stock | Stock % | Pipe | Total | Total % | Order Bank |
| | 108.8 | | 17 | 100% | 79 | | 32 | 100% | 27 | 59 | 100% | 2 |
| Color A | 106 | 2.8 | 7 | 41.2% | 112 | -33.0 | 10 | 31.3% | 7 | 17 | 28.8% | 1 |
| Color B | 112 | -3.2 | 8 | 47.1% | 67 | 12.0 | 17 | 53.1% | 9 | 26 | 44.1% | 1 |
| Color C | 106 | 2.8 | 2 | 11.8% | 54 | 25.0 | 5 | 15.6% | 11 | 16 | 27.1% | 0 |

Past Model Year/90 Days Sales

| | DEALER | | | | | | | | | | | |
|---|---|---|---|---|---|---|---|---|---|---|---|---|
| | DTT | Diff DTT | Sales | Sales % | DOL | Diff DOL | Stock | Stock % | Pipe | Total | Total % | Order Bank |
| | 94.1 | | 36 | 100% | 79 | | 32 | 100% | 27 | 59 | 100% | 2 |
| Color A | 80 | 14.1 | 16 | 44.4% | 112 | -33.0 | 10 | 31.3% | 7 | 17 | 28.8% | 1 |
| Color B | 111 | -16.9 | 13 | 36.1% | 67 | 12.0 | 17 | 53.1% | 9 | 26 | 44.1% | 1 |
| Color C | 95 | -0.9 | 7 | 19.4% | 54 | 25.0 | 5 | 15.6% | 11 | 16 | 27.1% | 0 |

Past Model Year/Full Model Year Sales

| | DEALER | | | | | | | | | | | |
|---|---|---|---|---|---|---|---|---|---|---|---|---|
| | DTT | Diff DTT | Sales | Sales % | DOL | Diff DOL | Stock | Stock % | Pipe | Total | Inv % | Order Bank |
| | 50.2 | | 151 | 100% | 79 | | 32 | 100% | 27 | 59 | 100% | 2 |
| Color A | 42 | 8.2 | 58 | 38.4% | 112 | -33.0 | 10 | 31.3% | 7 | 17 | 28.8% | 1 |
| Color B | 70 | -19.8 | 49 | 32.5% | 67 | 12.0 | 17 | 53.1% | 9 | 26 | 44.1% | 1 |
| Color C | 39 | 11.2 | 44 | 29.1% | 54 | 25.0 | 5 | 15.6% | 11 | 16 | 27.1% | 0 |

FIG. 15C

Past Model Year/30 Days Sales

| | DISTRICT | | | | | | | | | |
|---|---|---|---|---|---|---|---|---|---|---|
| | DTT | Diff DTT | Sales | Sales % | DOL | Diff DOL | Stock | Stock % | Total | Total % |
| | 71.4 | | 33 | 100% | 59 | | 107 | 100% | 271 | 100% |
| Color A | 72 | -0.6 | 12 | 36.4% | 71 | -11.7 | 36 | 33.6% | 210 | 77.5% |
| Color B | 72 | -0.6 | 16 | 48.5% | 53 | 6.3 | 45 | 42.1% | 43 | 15.9% |
| Color C | 68 | 3.4 | 5 | 15.2% | 54 | 5.3 | 26 | 24.3% | 18 | 6.6% |

Past Model Year/90 Days Sales

| | DISTRICT | | | | | | | | | |
|---|---|---|---|---|---|---|---|---|---|---|
| | DTT | Diff DTT | Sales | Sales % | DOL | Diff DOL | Stock | Stock % | Total | Total % |
| | 58.0 | | 115 | 100% | 59.3 | | 107 | 100% | 271 | 100% |
| Color A | 61 | -3.0 | 40 | 34.8% | 71 | -11.7 | 36 | 33.6% | 210 | 77.5% |
| Color B | 59 | -1.0 | 43 | 37.4% | 53 | 6.3 | 45 | 42.1% | 43 | 15.9% |
| Color C | 53 | 5.0 | 32 | 27.8% | 54 | 5.3 | 26 | 24.3% | 18 | 6.6% |

Past Model Year/Full Model Year Sales

| | DISTRICT | | | | | | | | | |
|---|---|---|---|---|---|---|---|---|---|---|
| | DTT | Diff DTT | Sales | Sales % | DOL | Diff DOL | Stock | Stock % | Total | Total % |
| | 41.9 | | 704 | 100% | 59.3 | | 107 | 100% | 271 | 100% |
| Color A | 41 | 0.9 | 207 | 29.4% | 71 | -11.7 | 36 | 33.6% | 210 | 77.5% |
| Color B | 51 | -9.1 | 291 | 41.3% | 53 | 6.3 | 45 | 42.1% | 43 | 15.9% |
| Color C | 30 | 11.9 | 206 | 29.3% | 54 | 5.3 | 26 | 24.3% | 18 | 6.6% |

Past Model Year/30 Days Sales

| | REGION | | | | | | | | | |
|---|---|---|---|---|---|---|---|---|---|---|
| | DTT | Diff DTT | Sales | Sales % | DOL | Diff DOL | Stock | Stock % | Total | Inv % |
| | 77.0 | | 105 | 100% | 65.0 | | 468 | 100% | 1159 | 100% |
| Color A | 67 | 10.0 | 31 | 29.5% | 61 | 4.0 | 117 | 25.0% | 295 | 25.5% |
| Color B | 82 | -5.0 | 53 | 50.5% | 70 | -5.0 | 224 | 47.9% | 512 | 44.2% |
| Color C | 79 | -2.0 | 21 | 20.0% | 60 | 5.0 | 127 | 27.1% | 352 | 30.4% |

Current Model Year/90 Days Sales

| | REGION | | | | | | | | | |
|---|---|---|---|---|---|---|---|---|---|---|
| | DTT | Diff DTT | Sales | Sales % | DOL | Diff DOL | Stock | Stock % | Total | Inv % |
| | 72.1 | | 468 | 100% | 65.0 | | 468 | 100% | 1159 | 100% |
| Color A | 60 | 12.1 | 131 | 28.0% | 61 | 4.0 | 117 | 25.0% | 295 | 25.5% |
| Color B | 82 | -9.9 | 204 | 43.6% | 70 | -5.0 | 224 | 47.9% | 512 | 44.2% |
| Color C | 69 | 3.1 | 133 | 28.4% | 60 | 5.0 | 127 | 27.1% | 352 | 30.4% |

Past Model Year/Full Model Year Sales

| | REGION | | | | | | | | | |
|---|---|---|---|---|---|---|---|---|---|---|
| | DTT | Diff DTT | Total | Sales % | DOL | Diff DOL | Stock | Stock % | Total | Inv % |
| | 52.1 | | 2549 | 100% | 65.0 | | 468 | 100% | 1159 | 100% |
| Color A | 50 | 2.1 | 668 | 26.2% | 61 | 4.0 | 117 | 25.0% | 295 | 25.5% |
| Color B | 62 | -9.9 | 1104 | 43.3% | 70 | -5.0 | 224 | 47.9% | 512 | 44.2% |
| Color C | 40 | 12.1 | 777 | 30.5% | 60 | 5.0 | 127 | 27.1% | 352 | 30.4% |

VEHICLE ORDERING SYSTEM

BACKGROUND

1. Field of the Invention

The invention is in the field of electronic systems for dealers to order vehicles from manufacturers.

2. Related Art

Automobile manufacturers do not generally sell directly to the public instead relying on dealerships to assume that responsibility each representing or promoting one or more specific manufacturer's brand of vehicle. And unlike other types of products which have a more limited range of models and configurations, the variety of individual vehicle models and configurations can be large and varied. Further, customer demand for a particular model, configuration or color can be as much an emotional desire as anything else. For these and other reasons, dealerships have long struggled with the ongoing question of what vehicles to order from the manufacturer in order to ensure their inventory matches customer demand while minimizing the costs of excess or slow-moving inventory which can negatively impact dealer profitability.

Traditionally, dealerships have manually determined which vehicles to order from manufacturers. Such manual processes typically lacked any analytic framework for determining what vehicles to order instead relying on the dealership's owner or manager having a sense or feel for the customer demand for particular model (sometimes referred to as intuition or "gut feel"). This was thought reasonable since such owners and managers oftentimes had previously been sales personnel believed to know what the dealership customers wanted. Despite the proliferation of computers in the modern work world, dealerships still typically operate in this fashion.

Of course, wanting to improve sales figures and revenues, some vehicle manufacturers have sought to automate the ordering process for their dealerships. However, such attempts have largely been directed to simply telling the dealership what vehicles to order with little explanation regarding why those particular recommendations are being made or providing much ability for the dealerships to modify or tailor the recommendations thus leaving dealerships in the uncomfortable position of having to either accept or deny the recommendation(s) in a sort of "take it leave it" approach. As a result, many dealerships continue to order vehicles using the old-fashioned gut feel approach.

What is needed, therefore, is a way for dealerships to be able to order vehicles from a manufacturer using an analytical framework to identify which vehicle configuration(s) to order and that still provides flexibility in the ordering process.

SUMMARY

A system for recommending to a dealership (or other intermediary between a manufacturer and a consumer) a vehicle configuration to order from a vehicle manufacturer based on various factors and calculated metrics is shown and described herein with reference to a number of specific embodiments.

In one embodiment is a method for a vehicle ordering computing system to recommend to a dealership one or more vehicles to be ordered from a manufacturer, the method comprising: a) receiving information at the vehicle ordering system via an electronic communication from a computing system of the manufacturer, the information comprising: various vehicle configurations which can be ordered from the manufacturer; past sales of the manufacturer's vehicles by the dealership, a district in which the dealership resides and a region in which the dealership's district resides; and current inventory of the manufacturer's vehicles by the dealership, the district and the region; b) calculating time factors based on the received past sales information; c) calculating a size of the dealership based on the received past sales information and the received current inventory information; d) obtaining metric factors, sizing factors, order bank delivery factors and pipeline delivery factors based on the calculated dealership size; e) calculating a factored dealership inventory percentage for each vehicle model; f) calculating a factored sales stock gap metric; g) calculating a factored dealership inventory percentage versus area sales percentage metric; h) calculating a factored total sales percentage metric; i) calculating a factored days to turn metric; j) calculating a factored days on lot metric; k) recommending a vehicle configuration to order based on the factored sales stock gap metric, the factored dealership inventory percentage versus area sales percentage metric, the factored total sales percentage metric, the factored days to turn metric and the factored days on lot metric; l) placing the recommended vehicle configuration into an order bank of the dealership; and m) repeating steps (e) through (l) to recommend another vehicle to order from the manufacturer.

BRIEF DESCRIPTION OF THE DRAWING

FIG. 3 is an example time factor calculation in a spreadsheet tabular format.

FIG. 4 is an example factored dealership inventory percentage calculation in a spreadsheet tabular format.

FIG. 5 is an example factored sales stock gap calculation in a spreadsheet tabular format.

FIG. 6 is an example factored dealership inventory percentage versus area sales percentage calculation in a spreadsheet tabular format.

FIG. 7 is an example factored total sales percentage calculation in a spreadsheet tabular format.

FIG. 8 is an example factored days to turn calculation in a spreadsheet tabular format.

FIG. 9 is an example factored days on lot calculation in a spreadsheet tabular format.

FIG. 10 is an example recommended model determination calculation in a spreadsheet tabular format.

FIG. 11 is an example set of manufacturer provided model information in a spreadsheet tabular format.

FIGS. 12*a*-12*h* are package examples corresponding to the model examples of FIGS. 3-10.

FIG. 13 is an example set of manufacturer provided package information in a spreadsheet tabular format.

FIGS. 14*a*-14*h* are color examples corresponding to the model examples of FIGS. 3-10.

FIG. 15 is an example set of manufacturer provided color information in a spreadsheet tabular format.

DETAILED DESCRIPTION

Unlike a century ago when you could have your Ford Model T (manufactured by the Ford Motor Company of Dearborn, Mich.) in any color you wanted so long as it was the color black, in the modern world each vehicle in a manufacturer's line comes in a dizzying array of models, packages and colors (not to mention the various dealer installable accessories such as audio and/or entertainment systems, body mouldings, floor mats, sport exhausts, leather shift knobs, etc.). Using Toyota Motor Corporation of Japan as an example manufacturer, just within the Camry vehicle line there are at least five different models (e.g., the base model, the LE, the SE, the XLE and the hybrid), there are at least three different packages (e.g., the base package, the extra value package and the sport leather package) and there are numerous different color choices (e.g., super white, classic silver metallic, magnetic gray metallic, black, barcelona red metallic, sandy beach metallic, aloe green metallic and blue ribbon metallic). Presented with this many choices, dealerships often find it a difficult task to know what to do when it comes time to order the next batch of vehicles from the manufacturer.

In various embodiments of the vehicle ordering system described herein dealerships are automatically provided with one or more recommended vehicles to order from the manufacturer. This recommendation is an intelligent one in that it is based on various metrics and factors as is described further elsewhere herein. Such a recommended vehicle can be placed into the dealership's order bank (which is a list of one or more vehicles a dealership is considering ordering from the manufacture but has not yet finalized or completed such order with the manufacturer). This system also operates interactively by suggesting to the dealership one or more additional vehicles to order based on the one or more vehicles already in the dealership's order bank. This is accomplished as will be explained by having the metrics used to make vehicle recommendations use information about what vehicles are in the dealership's order bank.

Figure 1:
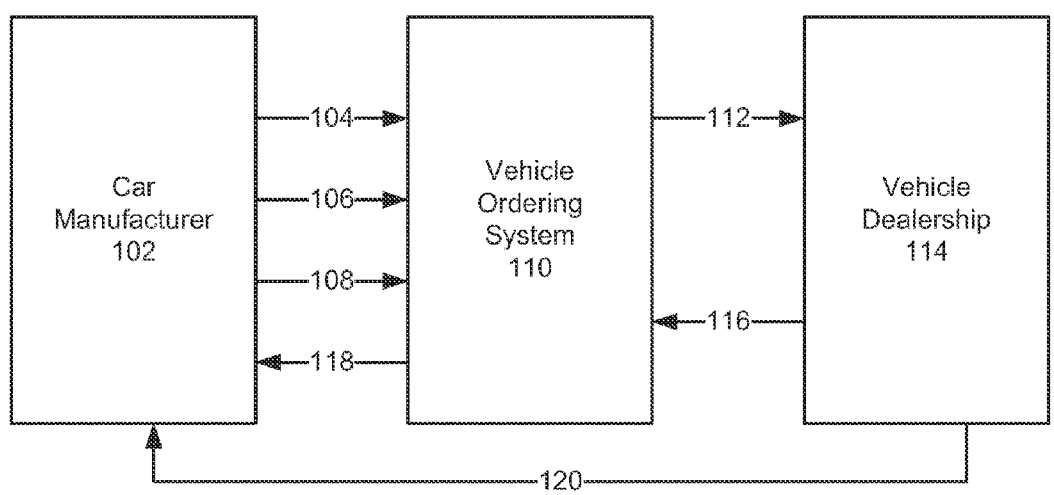
FIG. 1 is a block diagram of a vehicle ordering system as may be used according to an embodiment.

Referring now to FIG. 1, a block diagram is shown depicting a car manufacturer 102, a vehicle ordering system 110 and a dealership 114, all in communication.

Car manufacturer 102, using any of a large variety of computing systems known in the art, provides various information to vehicle ordering system 110 including past sales information 104, current inventory information 106 and vehicle product structure information 108.

In one embodiment, vehicle ordering system 110 is one or more server computers separately located from car manufacturer 102 and dealership 114.

In one embodiment, past sales information 104 includes sales information for the time periods of the past 30 days, the past 90 days and the entire model year, for each of the current model year and the most recent past model year, for each of dealership 114, the dealership district which includes dealership 114 and the dealership region which includes dealership 114, as well as some calculated information based on same as is explained elsewhere herein.

Also in one embodiment, cu ent inventory information 106 includes current inventory information for each of dealership 114, the dealership district which includes dealership 114 and the dealership region which includes dealership 114.

As is known in the art, a district is typically made up of 10-30 individual dealerships located in a similar geographic region (e.g., the San Francisco Bay Area may be a district). Similarly, a region is typically made up of 10-20 districts (and therefore approximately 100-400 dealerships). The size and geographical area of regions is, however, somewhat more dependent upon the size of the manufacturer (typically measured by the number of vehicles manufactured and sold). For example, Ford Motor Company of Dearborn, Mich. treats Northern California as a single region while Mazda Motor Company of Japan treats the Western United States as a single region.

Also in one embodiment, vehicle product structur information 108 includes information regarding the various vehicle models, packages and colors possible to be ordered from manufacturer 102.

Vehicle ordering system 110, using the information received from manufacturer 102, makes one or more vehicle order recommendations 112 to dealership 114 which is typically received via a personal computer located at dealership 114.

Dealership 114 can either accept the vehicle ordering system 110 recommendation 112 in the dealership's order bank or, instead, choose a different vehicle configuration for placement in the dealership's order bank. Once dealership 114 is ready to commit to ordering the vehicles in the order bank, the order is communicated from dealership 114 to manufacturer 102 either through vehicle ordering system 110 via order communications 116 and 118 or directly via order communication 120.

It is to be understood that the various information, recommendation(s) and ordering described herein are communicated between car manufacturer 102, vehicle ordering system 110 and dealership 114 using any known electronic communication mechanism such as, for example, using local or wide area network, web or internet based communications and/or protocols. Alternatively, as appropriate and desired, some of these may instead be communicated via other forms of communications including, for example, in a written hardcopy form in the case of dealership 114 placing an order with manufacturer 102.

It is also to be understood that the methods, processes and operations described herein are implemented in some embodiments as computing instructions stored on one or more computer readable medium and which instructions can run on the computing system(s) of car manufacturer 102, the one or more server computers of vehicle ordering system 110 and personal computer located at dealership 114 as appropriate to the described functionalities.

Figure 2:
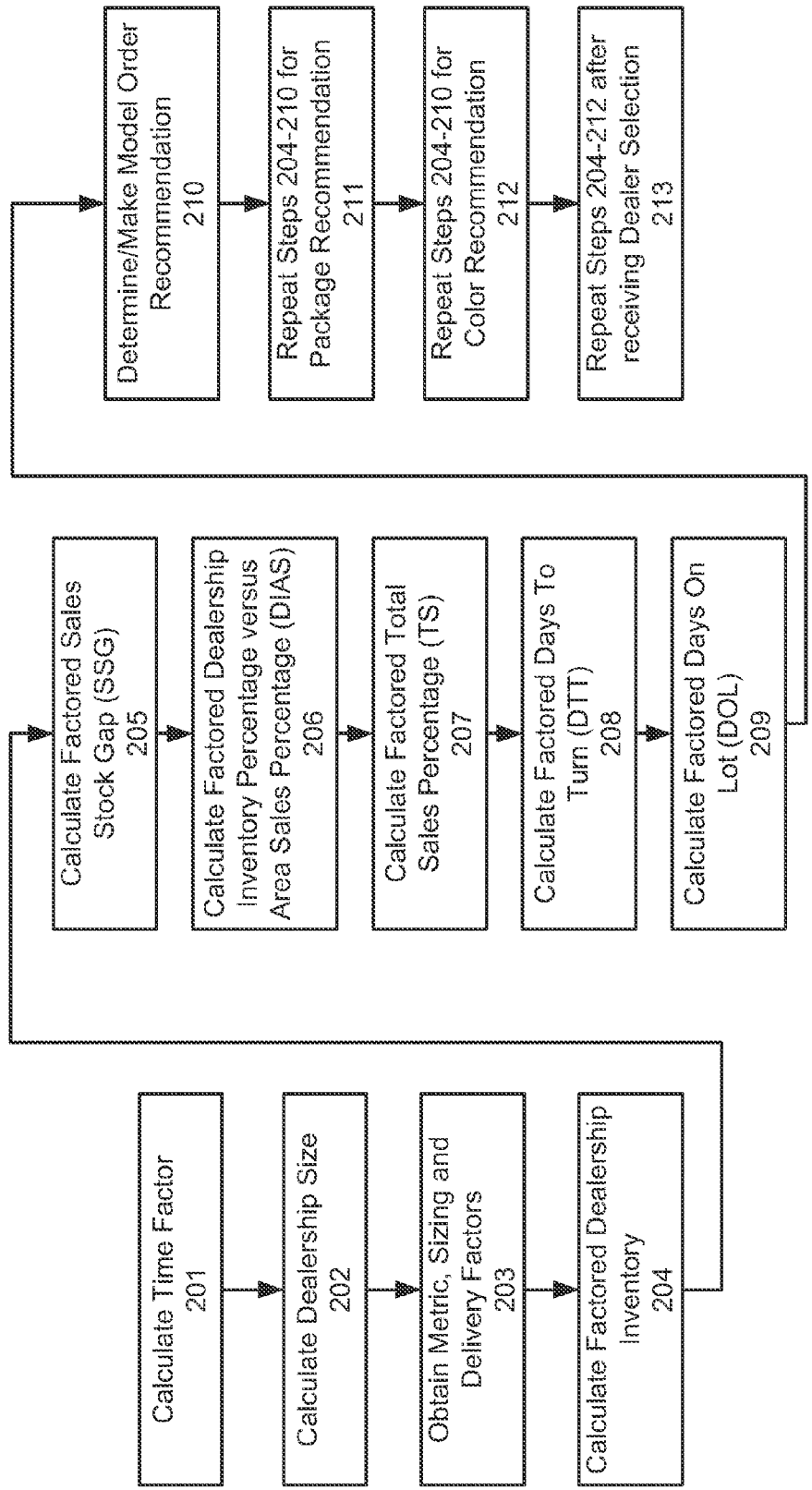
FIG. 2 is a flowchart of the process of recommending a vehicle configuration to order according to one embodiment.

Referring now to FIG. 2, a process flow diagram can be seen of vehicle ordering system 110 of FIG. 1 making a vehicle recommendation to dealership 114 using information provided by car manufacturer 102. An example will now be described with reference to FIGS. 2-15 wherein the car manufacturer 102 provided information can be seen in tabular form in FIG. 11 regarding model data, in FIG. 13 regarding package data and in FIG. 15 regarding color data.

Referring again to FIG. 2, in step 201 vehicle ordering system 110 calculates time factors for past vehicle sales. As will explained, time factors balance or weight the impact of past sales between different sales time periods, between different model years and between the dealer, district and region levels on the ultimately recommended vehicle configuration.

In one embodiment, calculating a time factor is accomplished by increasing current model year sales numbers to emphasize them over past model year sales. Then, a weighted percentage of current model year sales versus the sum of current model year sales and past model year sales as well as a weighted percentage of past model year sales versus the sum of current model year sales and past model year sales is calculated within each of the relevant sales time periods (e.g., 30 days, 90 days and full model year sales periods). It is a weighted percentage because of the increased current model year sales numbers. Then, for each of the current model year and the past model year, the most significant sales time period figures (e.g., 90 day sales figures) are emphasized over the next most significant sales time period (e.g., 30 day sales figures) which are emphasized over the next most significant sales time period (e.g., full model year sales figures) by multiplying the above-calculated weighted percentages for each by selected time period relative weightings (e.g., 90 day sales weighted percentages receive a 70% weighting, 30 day sales weighted percentages receive a 20% weighting and full model year sales weighted percentages receive a 10% weighting. Note that these weightings could be set to other values, e.g., during times of low volatility the 90 days sales would be more heavily weighted versus the other sales time periods while during times of high volatility the 30 days sales would be more heavily weighted versus the other sales time periods). Each of these calculations is performed at the dealer, district and region level. This results in a total of eighteen (18) weighted time factors of past sales, one for each time period of 30 days, 90 days and full model year (hence 3x), for both current and past model years (hence 2x), all at the dealer, district and region levels (hence 3x).

Referring now to FIG. 3, an example time factor calculation is shown in a spreadsheet tabular format. As can be seen, the table includes figures at the dealership level 301, the district level 302 and the region level 303. Within each are two sections, the first section for the current model year and the second section for the past model year, each section including three columns, one for the 30 day time period, one for the 90 day time period and one for the full model year time period.

As an example time factor calculation, following the process described above, reference is now made to the 30 day sales time period column within the current model year section of the dealership level 301 wherein the number of units of that vehicle sold in that 30 day sales time period is shown at 304 as "1" which, because it is the current model year, is emphasized by doubling it to "2" as shown at 305. The weighted percentage of the weighted 30 day sales time period of the current model year versus the unweighted 30 day sales time period of the past model year is then calculated in this example as 2/(2+31) which results in weighted percentage of 6.1% as shown at 306. Then, because this is a weighted percentage for the 30 day sales time period it receives a time period relative weighting by being multiplied by 20%, as shown at 307, thereby resulting in a dealership level 30 day sales time factor for the current model year of 1.2% as shown at 308. Following the process described above, similar calculations are likewise performed for each of the other time periods with each of the current and past model years at the dealership, district and region level as can be seen in the figure.

Referring again to FIG. 2, in step 202 vehicle ordering system 110 calculates a size of the dealership. As will be explained, the dealership size can be used to factor between dealership information and district and/or region information in order to emphasize dealership information (or de-emphasize district and/or region information) in the case of a large(r) dealership and de-emphasize dealership information (or emphasize district and/or region information) in the case of a small(er) dealership.

Calculating or determining a dealership's size can be accomplished in various ways. In one embodiment this is accomplished by adding the dealership's 90 days sales for the current model year (e.g., 3 as shown at 1103 in FIG. 11) to the dealership's 90 day sales for the past model year (e.g., 92 as shown at 1104 in FIG. 11) which is then added to the dealership's total inventory (note that total inventory is the total number in stock of all models, namely model A, model B and model C, of a particular vehicle, e.g., 59+131+23=213, as shown at 1102 in FIG. 11). Referring again to FIG. 3, this results in a total of 308 (=3+92+213) as shown at 309 thus making this particular dealership a size "XXL" (in the 300-400 range) as shown at 310.

Referring again to FIG. 2, in step 203 metric, sizing and (order bank and pipeline) delivery factors are obtained by vehicle ordering system 110 using the determined dealership size and are then used in the various metrics as will be explained. These factors are subjective weightings that are implementation specific based on an implementer's experience, hand tuning and/or trial and error as desired. Refferring now to FIG. 4, an example set of metric, sizing and (order bank and pipeline) delivery factors can be seen for each of the herein described metrics (sales stock gap, dealer inventory percentage versus area sales percentage, total sales percentage, days to turn and days on lot) for each of the various dealership sizes. As can be seen in this example and as explained with reference to the calculations described elsewhere herein, metric factors are weightings between the metrics used, sizing factors are weightings based on dealership size to affect dealership information versus district and region information, and order bank delivery factors and pipeline delivery factors are weightings to emphasize what is already in a dealership order bank and pipeline versus what is already in stock.

Referring again to FIG. 2, in step 204 vehicle ordering system 110 calculates a factored dealership inventory percentage. This calculation results in a reweighting of dealership inventory percentage between units in the order bank and the pipeline versus units already in stock. In particular, the factored dealership inventory percentage is used in some of the metrics to emphasize units in the order bank and the pipeline over units already in stock. Such emphasis helps prevent recommendations which can cause a dealership to fill gaps in its inventory too quickly. Note further that, as will be shown, the extent of this reweighting is also based on the dealership size as calculated above because the factored dealership inventory is calculated using the dealership delivery order bank factor and the dealership delivery pipeline factor as obtained above.

Calculating a factored dealership inventory percentage can be accomplished in various ways. In one embodiment this is accomplished by first calculating, for each model of a particular vehicle, a new order bank total by multiplying the number of units of that model in the dealership's order bank by the sum of one plus the dealership delivery order bank factor as obtained above. Then a new pipeline total is calculated for each model of a particular vehicle by multiplying the number of units of that model in the dealership's pipeline by the sum of one plus the dealership delivery pipeline factor. Then a new total inventory number for each model is calculated by adding the new order bank total for that model to the new pipeline total for that model to the number of units in stock of that model. Then, the factored dealer inventory percentage for each model is obtained by dividing the new total inventory number for each model by the sum of the new total inventory numbers for all of the models.

Referring again to FIG. 4, an example factored dealership inventory percentage calculation is shown according to the process described above. First the number of units in the dealership's order bank, which is 3 as shown at 402, is multiplied by the sum of one plus the dealership delivery order bank factor, which is also 3 as shown at 403, which results in a new order bank total of 12 (=3×(1+3)) as shown at 404. Then the number of units in the pipeline, which is 131 as shown at 405, is multiplied by the sum of one plus the dealership delivery pipeline factor, which is 0.15 as shown at 406, which results in a new pipeline total of 150.65 (=131×(1+0.15)) as shown at 407. Then the new order bank total of 12 is added to the new pipeline total of 150.65 which is added to the number of units in stock, which is 82 as shown at 401, which results in a new total inventory number of 244.65 (=12+150.65+82) as shown at 408. The new total inventory number for each model is then divided by the sum of the new total inventory numbers for all models (e.g., 71.05/244.65) to yield a factored dealership inventory percentage of 29.0% (=71.05/244.65) for model A as shown at 409, of 60.6% (=(48.2/244.65) for model B as shown at 410 and 10.4% (=25.4/244.65) for model C as shown at 411.

Referring again to FIG. 2, in step 205 vehicle ordering system 110 calculates a factored sales stock gap (SSG) metric. This metric indicates the gap between inventory level and sales rates where any difference reveals that true demand is different than current stocking levels (and therefore filling such gaps is important to having the right inventory). In one embodiment, a factored sales stock gap for each model is calculated according to the formula (sales percentage—factored inventory percentage)(metric factor)(sizing factor) (time factor), which is applied to each relevant time period (e.g., 30 day sales, 90 days sales, full model year sales), for both the current model year and the past model year, and at the dealership, district and region levels, all told resulting in 18 subtotals which are added together to yield a factored sales stock gap for that vehicle model.

Referring now to FIG. 5, an example factored sales stock gap calculation can be seen in a spreadsheet tabular form. In particular, with respect to a current model year 30 day sales for model A, the factored inventory percentage of 29% as shown at 503 is subtracted from the sales percentage of 100% as shown at 504 to yield a sales stock gap of 71% as shown at 502 which is then multiplied by an XXL dealership sales stock gap group factor of 100 (obtained in step 203) which is multiplied by an XXL dealership size SSG metric sizing dealership factor of 2 (also nbtaiucd in step 203) which is multiplied by a dealership level current model year 30 day sales time factor of 1.2% (obtained in step 201) to thereby yield a factored sales stock gap of 1.7 (=(100%−29%)(100)(2)(1.2%)) as shown at 501. Such calculation is then performed for each relevant time period (e.g., 30 day sales, 90 day sales, full year sales, each for the current model year and the past model year, and at the dealership, district and region levels, thus resulting in 18 subtotals for each model which are then added together to yield a factored sales stock gap figure for each model. For example, the factored sales stock gap figure for model A is 18.6 (=1.7+0.1+−0.1+0.4+0.7+−0.1+ 0.0+0.0+0.0+9.7+−0.4+−0.4+13.3+−3.0+−1.2+−0.9+−0.5+−0.6) as shown at 505. It is to be understood that the results shown may vary slightly from the summation of the numbers shown because the spreadsheet from which the table was generated automatically rounds the numbers up or down as appropriate.

Referring again to FIG. 2, in step 206 vehicle ordering system 110 calculates a factored dealership inventory percentage versus area sales percentage (DIAS) metric. This metric is useful in applying broader market trends to dealership recommendations and selections. For example, if a district is selling a particular model/package/color configuration at a higher rate than the dealership is stocking that configuration this metric will indicate this. In one embodiment, a factored dealership inventory percentage versus area sales percentage for each vehicle model is calculated according to the formula (sales percentage−factored dealership inventory percentage)(metric factor)(sizing factor)(time factor) for each of the district and region (but not for the dealership since that was already addressed in the sales stock gap metric), for each relevant time period (e.g., 30 day sales, 90 day sales, full model year sales), for both the current model year and the past model year, all told resulting in 12 subtotals which are added together to yield a factored dealership inventory percentage versus area sales percentage metric for that vehicle model.

Referring now to FIG. 6, an example factored dealership inventory percentage versus area sales percentage calculation can be seen in a spreadsheet tabular form. In particular, with respect to a current model year 30 day sales for model A, the factored dealership inventory percentage of 29% as shown at 603 is subtracted from the district level sales percentage of 31.3% as shown at 604 to yield a gap of 2.2% as shown at 602 which is then multiplied by an XXL dealership size dealer inventory versus area sales metric factor of 100 (obtained in step 203) which is multiplied by an XXL dealership size DIAS metric district sizing factor of 0.5 (obtained in step 203) which is multiplied by a district level current model year 30 day sales time factor of 4.2% (obtained in step 201) to thereby yield a factored dealership inventory percentage versus area sales percentage of 0.0 (=(31.3%−29%)(100)(0.5)(4.2%)) as shown at 601. Such calculation is then performed for each relevant time period (e.g., 30 day sales, 90 day sales, full model year sales), each for the current model year and the past model year, and at the district and region levels, thus resulting in 12 subtotals for each model which are then added together to yield a factored dealership inventory percentage versus area sales percentage figure for each model. For example, the factored dealership inventory percentage versus area sales percentage figure for model A is −2.8 (=0.0+−0.1+0.4+−0.1+ 0.0+0.0+−0.1+−0.2+−1.2+−0.9+−0.2+−0.3) as shown at 605. Again, it is to be understood that the results shown may vary slightly from the summation of the numbers shown because the spreadsheet from which the table was generated automatically rounds the numbers up or down as appropriate.

Referring again to FIG. 2, in step 207 vehicle ordering system 110 calculates a factored total sales percentage (TS). This metric is useful in that it is important for a dealership to stock the high selling vehicles that customers expect to see when they visit the dealership and these units drive the market and tend to sell quickly despite their higher inventory levels. In one embodiment, a factored total sales percentage for each vehicle model is calculated according to the formula (sales percentage)(metric factor)(sizing factor)(time factor), which is applied to each relevant time period (e.g., 30 day sales, 90 days sales, model year sales), for both the current model year and the past model year, and at the dealership, district and region levels, all told resulting in 18 subtotals which are added together to yield a factored sales stock gap for that vehicle model. The factored total sales percentage metric is an optional metric and therefore is not necessarily used in all embodiments.

Referring now to FIG. 7, an example factored total sales percentage calculation can be seen in spreadsheet tabular form. In particular, with respect to a current model year 30 day sales for model A, the total sales percentage of 100% as shown at 702 is multiplied by an XXL dealership size total sales percentage metric factor of 10 (obtained in step 203) which is multiplied by an XXL dealership size total sales metric dealership sizing factor of 1 (also obtained in step 203) which is multiplied by a dealership level current model year 30 day sales time factor of 1.2% (obtained in step 201) to thereby yield a factored total sales percentage of 0.1 (=(100%)(10)(1)(1.2%)) as shown at 701. Such calculation is then performed for each relevant time period (e.g., 30 day sales, 90 day sales; full year sales, each for the current model year and the past model year, and at the dealership, district and region levels, thus resulting in 18 subtotals for each model which are then added together to yield a factored sales stock gap figure for each model. For example, the factored total sales percentage figure for model A is 9.4 (=0.1+0.1+

0.2+0.1+0.3+0.4+0.0+0.0+0.0+1.0+0.4+0.3+2.6+1.6+1.4+0.2+0.2+0.2) as shown at 703. Again, it is to be understood that the results shown may vary slightly from the summation of the numbers shown because the spreadsheet from which the table was generated automatically rounds the numbers up or down as appropriate.

Referring again to FIG. 2, in step 208, vehicle ordering system 110 calculates a factored days to turn (DTT) metric. This metric is useful in that the faster a vehicle sells (turns) the more quickly a new unit can arrive and be sold without building up excessive inventory. In one embodiment, a factored days to turn for each vehicle model is calculated according to the formula (differential days to turn)(sales percentage)(metric factor)(sizing factor)(time factor), which is applied to each relevant time period (e.g., 30 day sales, 90 days sales, full model year sales), for both the current model year and the past model year, and at the dealership, district and region levels, all told resulting in 18 subtotals which are added together to yield the factored days to turn for that vehicle model.

In one embodiment, differential days to turn is part of the past sales information 104 provided by manufacturer 102 to vehicle ordering system 110 (discussed with reference to FIG. 1). Differential days to turn for a given vehicle model is calculated by first summing the days to turn for each unit of each model in the vehicle line and dividing that sum by the total number of vehicle units sold (using, for example, the "sumproduct" function of Microsoft Excel), which results in a calculated average days to turn for all models, and then subtracting the dealership's days to turn for that given vehicle model from the calculated average days to turn for all models.

In one embodiment, sales percentage is part of the past sales information 104 provided by manufacturer 102 to vehicle ordering system 110 (discussed with reference to FIG. 1), Sales percentage is the percentage of a given vehicle model's sales relative to the total sales of all models of that vehicle.

Referring now to FIG. 8, an example factored days to turn calculation can be seen in a spreadsheet tabular form. In particular, with respect to a current model year 30 day sales for model A, the differential days to turn of 0.0 as shown at 803 is multiplied by a sales percentage of 100% as shown at 802 which is multiplied by an XXL dealership size days to turn metric factor of 1 (obtained in step 203) which is multiplied by an XXL dealership size days on lot metric dealership sizing factor of 0.5 (also obtained in step 203) which is multiplied by a dealership level current model year 30 day sales time factor of 1.2% (obtained in step 201) to thereby yield a factored days to turn of 0.0 (=(0.0)(100%)(1)(0.5)(1.2%)) shown at 801. Such calculation is then performed for each relevant time period (e.g., 30 day sales, 90 day sales, full year sales, each for the current model year and the past model year, and at the dealership, district and region levels, thus resulting in 18 subtotals for each model which are then added together to yield a factored days to turn figure for each model. For example, the factored days to turn figure for model A is 0.3 (=0.0+0.0+−0.1+0.0+0.0+0.0+0.0+0.0+−0.3+0.2+0.2+−2.0+1.3+1.0+0.0+0.1+0.1) as shown at 804. Again, it is to be understood that the results shown may vary slightly from the summation of the numbers shown because the spreadsheet from which the table was generated automatically rounds the numbers up or down as appropriate.

Referring again to FIG. 2, in step 209 vehicle ordering system 110 calculates a factored days on lot (DOL) metric. Vehicles that sit on the lot increase business carrying costs in what is known in the art as floor plan expense and therefore this metric is useful in lowering the chance of such vehicles being recommended. In one embodiment, a factored days on lot for each vehicle model is calculated according to the formula if differential days on lot is less than zero then (differential days on lot)(stock percentage)(metric factor)(sizing factor)(time factor), at the dealership, district and region levels resulting in 3 subtotals which are added together to yield a factored sales stock gap for that given vehicle model. Note that only using differential days on lot for a given vehicle model which happen to be less than zero (i.e., a negative number) ensures that we are only considering those vehicle models which have beers sitting longer than average on a dealership lot. The factored days on lot metric is an optional metric and therefore is not necessarily used in all embodiments.

Referring now to FIG. 9, an example factored days on lot calculation can be seen in a spreadsheet tabular form. In particular, with respect to a current model year 30 day sales for model A, the differential days on lot percentage of 3.5% as shown at 903, because it is a positive number, is multiplied by the dealership stock percentage of 39% as shown at 902 which is multiplied by an XXL dealership size days on lot metric factor of 1 (obtained in step 203) which is multiplied by an XXL dealership size days on lot metric dealership sizing factor of 0.33 (also obtained in step 203) which is multiplied by a dealership level current model year 30 day sales time factor of 1.2% (obtained in step 201) to thereby yield a factored days on lot of 0.0 (=(3.5%)(39%)(1)(0.33)(1.2%)) as shown at 901. Such calculation is performed at the dealership, district and region levels, thus resulting in 3 subtotals for each model which are then added together to yield a factored days on lot figure for each model. For example, the factored on lot figure for model A is 0.0 (=0.0+0.0+0.0) as shown at 904. Again, it is to be understood that the results shown may vary slightly from the summation of the numbers shown because the spreadsheet from which the table was generated automatically rounds the numbers up or down as appropriate.

Referring again to FIG. 2, in step 210 vehicle ordering system 110 determines which model vehicle to recommend. In one embodiment, this is done by adding up the totals for each model from each of the above-calculated metrics (e.g., for each model, the factored sales stock gap metric is added to the factored dealership inventory percentage versus area sales percentage metric which is added to the factored sales total percentage metric which is added to the factored days to turn metric which is added the factored days on lot metric to yield a total for that model) and the highest total is the one recommended.

Referring now to FIG. 10, an example recommended model determination calculation can be seen in a spreadsheet tabular form. In particular, with respect to model A, the factored sales stock gap of 18.6 as shown at 1001 is added to the factored dealership inventory percentage versus area sates percentage of −2.8 as shown at 1002 which is added to the factored sales total percentage of 9.4 as shown at 1003 which is added to the factored days to turn of 0.3 as shown at 1004 which is added to the factored days on lot of 0.0 as shown at 1005 to yield a total of 25.4 as shown at 1006. Such calculation is performed for each model and the model which receives the highest summed total (model A in this example) is the recommended vehicle model. Again, it is to be understood that the results shown may vary slightly from the summation of the numbers shown because the spreadsheet from which the table was generated automatically rounds the numbers up or down as appropriate.

In addition to recommending which model to order within a vehicle line, the present system can also recommend which package and color to order for that model as will now be explained.

Referring again to FIG. 2, in step 211 vehicle ordering system 110 determines which package to recommend for the recommended model by repeating steps 204 through 210 with the difference being that, instead of using manufacturer 102 provided model information as shown in FIG. 11, vehicle ordering system 110 now uses manufacturer 102 provided package information as shown in FIGS. 12a-12h and FIG. 13. The calculations and process by which package determinations are made is otherwise identical. This results in a recommended package for the recommended model.

In step 212 vehicle ordering system 110 determines which color to recommend for the recommended model by repeating steps 204 through 210 with the difference being that, instead of using manufacturer 102 provided model information as shown in FIG. 11, vehicle ordering system 110 now uses manufacturer 102 provided color information as shown in FIG. 14a-14h and FIG. 15. The calculations and process by which color determinations are made is otherwise identical. This results in a recommended color for the recommended model.

Figure 16:
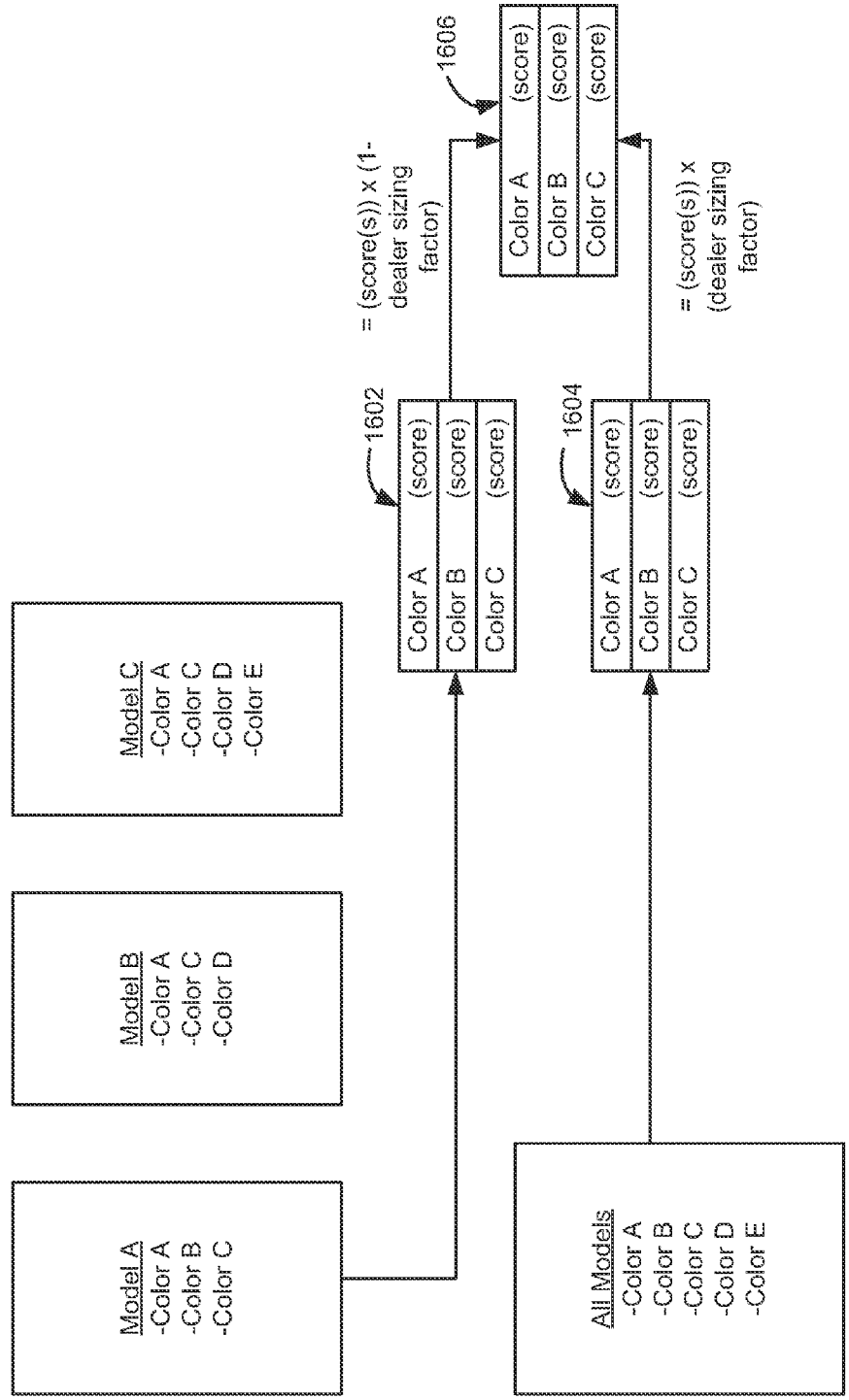
FIG. 16 is an alternative example of how a color recommendation can be made.

An alternative embodiment is shown in the process flow of FIG. 16. In this alternative embodiment, additional processing is performed on the results of step 212 to obtain a recommended color for the recommended model. In this alternative embodiment, each of the resulting ranked colors 1602 of step 212 is then multiplied by one minus the dealership sizing factor (e.g., 1.0−0.30=70%). Additionally, the process of steps 204-210 is repeated based on manufacturer 102 provided color information for all models in the vehicle line and the resulting ranked colors 1604 are likewise multiplied by the dealership sizing factor (e.g., 30%). Then, for each color, each of these newly weighted color numbers are added together 1606 and the color with the resulting highest number is the one recommended.

It is to be understood that step 212 could be performed before step 211 or that that the performance of step 211 and step 212 could overlap in time. Regardless of which sequence is followed or implemented, the outcome is that vehicle ordering system 110 makes a recommendation within a vehicle line of which vehicle configuration (model, package and color) for dealership 114 to order from manufacturer 102.

Further, the vehicle configuration recommended by the vehicle ordering system 110 can be placed in dealership 114's order bank either by vehicle ordering system 110 or by dealership 114 (e.g., by a user operating a computing system of dealership 114 accepting the recommended configuration). Still further, regardless of whether dealership 114 ultimately places such order with manufacturer 102, having the recommended vehicle in the dealership's order bank causes it to be part of the above calculations in a subsequent recommendation which, as has been explained, takes into account vehicles in the dealership's order bank. In this way, vehicle ordering system 110 operates interactively by giving dealership 114 the opportunity, in step 213, to try out differing vehicle configurations in a "what if" manner by having them in dealership 114's order bank and seeing which other vehicle configurations then get recommended. This interactivity also allows dealership 114 to place one or more vehicle configurations into its order bank which may or may not have been recommended by vehicle ordering system 110 and see how such recommended or non-recommended vehicle configurations affect subsequent system recommended vehicle configurations. This provides dealership 114 with the ability to choose vehicle configurations which it believes will sell yet still gain the benefit of vehicle ordering system 110 providing recommendations for other vehicle configurations to add to its vehicle orders to be placed with manufacturer 102.

it is to be understood that the sales time periods of 30 days, 90 days and full model year sales time periods described herein are simply one example or embodiment and that the systems and methods described herein are equally applicable to other sales time periods. As much, the 30 day sales time period could be considered a short sales time period, the 90 day sales time period could be considered a medium sales time period and the full model year sales time period could be considered a long sales time period. Therefore, a short sales time period could be a 30 day sales time period or some other sales time period that is short relative to other sales time periods, a medium sales time period could be a 90 day sales time period or some other sales time period that is medium relative to other sales time periods and a long sales time period could be the full model year sales time period or some other sales time period that is long relative to other sales time periods.

It is also to be understood that the present invention is not limited to recommending or ordering of a passenger vehicle and, instead, the ideas and techniques described can be applied to ordering one or more vehicles of any type including cars, trucks, motorcycles, boats, motor homes, airplanes, scooters, all terrain vehicles (ATVs), etc. Further, it is to be understood that the ideas and techniques described herein are not limited to recommending or ordering of a vehicle and can therefore be applied to the recommending or ordering of any item having multiple possible item configurations.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, the description and the drawing should not be considered in a limiting sense, as it is understood that the present invention is in no way limited to only the embodiments illustrated.

What is claimed is:

1. A method for a vehicle ordering computing system to recommend to a dealership one or more vehicles to be ordered from a manufacturer, the method comprising:

a) receiving information at the vehicle ordering system via an electronic communication from a computing system of the manufacturer, the information comprising:

various vehicle configurations which can be ordered from the manufacturer;

past sales of the manufacturer's vehicles by the dealership, a district in which the dealership resides and a region in which the dealership's district resides; and current inventory of the manufacturer's vehicles by the dealership, the district and the region;

b) calculating, in the vehicle ordering computing system, time factors based on the received past sales information;

c) calculating, in the vehicle ordering computing system, a size of the dealership based on the received past sales information and the received current inventory information;

d) obtaining metric factors, sizing factors, order bank delivery factors and pipeline delivery factors based on the calculated dealership size;

e) calculating, in the vehicle ordering computing system, a factored dealership inventory percentage for each vehicle model;

f) calculating, in the vehicle ordering computing system, a factored sales stock gap metric by, for each of the short sales time period, the medium sales time period and the long sales time period, for each of the current model year and the past model year, subtracting the factored inventory percentage for each vehicle model from the sales percentage of that vehicle model and multiplying the result by a metric factor, a sizing factor and a time factor, and summing the total of each;

g) calculating, in the vehicle ordering computing system, a factored dealership inventory percentage versus area sales percentage metric;

h) calculating, in the vehicle ordering computing system, a factored total sales percentage metric;

i) calculating, in the vehicle ordering computing system, a factored days to turn metric;

j) calculating, in the vehicle ordering computing system, a factored days on lot metric;

k) recommending a vehicle configuration to order based on the factored sales stock gap metric, the factored dealership inventory percentage versus area sales percentage metric, the factored total sales percentage metric, the factored days to turn metric and the factored days on lot metric;

l) placing the recommended vehicle configuration into an order bank of the dealership;

m) repeating steps (e) through (l) to recommend another vehicle to order from the manufacturer.

2. The method of claim 1 wherein the past sales information and current inventory information received in step (a) comprises vehicle model sales and inventory information, vehicle package sales and inventory information and vehicle color sale and inventory information and wherein steps (e) through (k) are first performed based on the vehicle model sales and inventory information to determine which vehicle model to recommend as part of step (k), steps (e) through (k) are repeated based on the vehicle package sales and inventory information to determine which vehicle package to recommend as part of step (k), and steps (e) through (k) are repeated based on the vehicle color sales and inventory information to determine which vehicle color to recommend as part of step (k).

3. The method of claim 1 wherein calculating time factors based on the received past sales information in step (b) is performed by:

increasing current model year sales over past model year sales within each of a short sales time period, a medium sales time period and a long sales time period;

calculating a weighted percentage of current model year sales versus past model year sales for each of the current model year short sales time period, the current model year medium sales time period and the current model year long sales time period;

calculating a weighted percentage of past model year sales versus current model year sales for each of the past model year short sales time period, the past model year medium sales time period and the past model year long sales time period;

and, emphasizing, for each of the current model year and the past model year, the weighted percentage of the medium sales time period over the medium sales time period which is emphasized over the long sales time period by multiplying each by a selected time period relevant weighting for each.

4. The method of claim 3 wherein the short sales time period is 30 days, the medium sales time period is 90 days and the long sales time period is a full model year.

5. The method of claim 1 wherein calculating a size of the dealership based on the received past sales information and the received current inventory information in step (c) is performed by adding the dealership's sales for a medium sales time period for the current model year to the dealership's sales for the medium time period for the past model year to the dealership's total inventory.

6. The method of claim 5 wherein the medium sales time period is 90 days.

7. The method of claim 1 wherein calculating a factored dealership inventory percentage for each vehicle model is performed by:

calculating a new order bank total for that vehicle model by multiplying the number of units in the dealership's order bank of that vehicle model by the sum of one plus the dealership delivery order bank factor;

calculating a new pipeline total for that vehicle model by multiplying the number of units in the dealership's pipeline of that vehicle model by the sum of one plus the dealership delivery pipeline factor;

calculating a new total inventory number for that vehicle model by adding the new order bank total for that vehicle model to the new pipeline total for that vehicle model to the number of units in stock of that vehicle model;

and dividing the new total inventory number for that vehicle model by the sum of the new total inventory numbers for all of the vehicle models.

8. The method of claim 1 wherein the short sales time period is 30 days, the medium sales time period is 90 days and the long sales time period is a full model year.

9. The method of claim 1 wherein calculating a factored dealership inventory percentage versus area sales percentage metric is performed by, for each of the short sales time period, the medium sales time period and the long sales time period, for each of the current model year and the past model year, at a district and region level, subtracting the factored dealership inventory percentage from the sales percentage of that vehicle and multiplying the result by a metric factor, a sizing factor and a time factor, and summing the total of each.

10. The method of claim 9 wherein the short sales time period is 30 days, the medium sales time period is 90 days and the long sales time period is a full model year.

11. The method of claim 1 wherein calculating a factored total sales percentage metric is performed by, for each of the short sales time period, the medium sales time period and the long sales time period, for each of the current model year and the past model year, at the dealership, district and region level, multiplying a vehicle sales percentage by a metric factor, a sizing factor and a time factor, and summing the total of each.

12. The method of claim 11 wherein the short sales time period is 30 days, the medium sales time period is 90 days and the long sales time period is a full model year.

13. The method of claim 1 wherein calculating a factored days to turn metric is performed by, for each of the short sales time period, the medium sales time period and the long sales time period, for each of the current model year and the past model year, at the dealership, district and region level, multiplying a vehicle differential days to turn by a vehicle sales percentage, a metric factor, a sizing factor and a time factor, and summing the total of each.

14. The method of claim 13 wherein the short sales time period is 30 days, the medium sales time period is 90 days and the long sales time period is a full model year.

15. The method of claim 1 wherein calculating a factored days on lot metric is performed by, at the dealership, district and region level, multiplying a differential days on lot by a vehicle stock percentage, a metric factor, a sizing factor and a time factor, and summing the total of each.

16. The method of claim 1 wherein recommending a vehicle configuration to order based on the factored sales stock gap metric, the factored dealership inventory percentage versus area sales percentage metric, the factored total sales percentage metric, the factored days to turn metric and the factored days on lot metric is performed by summing the total of each and recommending the vehicle configuration with the highest resulting total.

17. The method of claim 1 wherein the recommended vehicle configuration is a vehicle model and the method is repeated to recommend a vehicle package for the recommended vehicle model.

18. The method of claim 1 wherein the recommended vehicle configuration is a vehicle model and the method is repeated to recommend a vehicle color for the recommended vehicle model.

\* \* \* \* \*